United States Patent
Takita et al.

(10) Patent No.: US 9,281,914 B2
(45) Date of Patent: Mar. 8, 2016

(54) APPARATUS AND METHOD FOR DESIGNING A NETWORK TRANSMITTING WAVELENGTH MULTIPLEXED OPTICAL SIGNALS

(71) Applicant: FUJITSU LIMITED, Kawasaki-shi, Kanagawa (JP)

(72) Inventors: Yutaka Takita, Kawasaki (JP); Kazuyuki Tajima, Yokosuka (JP); Tomohiro Hashiguchi, Inagi (JP)

(73) Assignee: FUJITSU LIMITED, Kawasaki (JP)

( * ) Notice: Subject to any disclaimer, the term of this patent is extended or adjusted under 35 U.S.C. 154(b) by 109 days.

(21) Appl. No.: 14/314,190

(22) Filed: Jun. 25, 2014

(65) Prior Publication Data
US 2015/0050016 A1    Feb. 19, 2015

(30) Foreign Application Priority Data
Aug. 13, 2013   (JP) .................................. 2013-168332

(51) Int. Cl.
*H04J 14/02*   (2006.01)

(52) U.S. Cl.
CPC .......... *H04J 14/0257* (2013.01); *H04J 14/0227* (2013.01); *H04J 14/0278* (2013.01)

(58) Field of Classification Search
CPC  H04J 14/0227; H04J 14/0257; H04J 14/0278
See application file for complete search history.

(56) References Cited

U.S. PATENT DOCUMENTS

| | | | | |
|---|---|---|---|---|
| 6,600,583 B1 * | 7/2003 | Fatehi | .................. | H04J 14/0227 370/351 |
| 2004/0136711 A1 * | 7/2004 | Finan | .................. | H04J 14/0227 398/59 |
| 2013/0195460 A1 * | 8/2013 | Kadohata | ............ | H04J 14/0257 398/79 |

FOREIGN PATENT DOCUMENTS

| | | |
|---|---|---|
| JP | 2005-86675 | 3/2005 |
| JP | 2010-199891 | 9/2010 |
| JP | 2013-90297 | 5/2013 |

* cited by examiner

*Primary Examiner* — David Payne
*Assistant Examiner* — Casey Kretzer
(74) *Attorney, Agent, or Firm* — Staas & Halsey LLP

(57) ABSTRACT

An apparatus determines, in response to demands for traffic between nodes in a network transmitting wavelength-multiplexed optical-signals, routes each providing connection between nodes, and estimates, for each link, communication-channels to be established, based on a wavelength-constraint condition that the number of communication-channels to be established be not greater than a first upper-limit for available optical-signal wavelengths. The apparatus assigns wavelengths to the communication-channels, based on a system-constraint condition that the number of optical-signals having an identical wavelength and redundantly usable be not greater than a second upper-limit for available transmission-systems. The apparatus determines a target-number of wavelengths for reducing a required number of transmission-systems. The apparatus changes the wavelength-constraint condition by defining the first upper-limit as the target-number and changes the system-constraint condition by reducing the second upper-limit, and re-estimates communication-channels based on the changed wavelength-constraint condition and re-assigns wavelengths based on the changed system-constraint condition.

18 Claims, 29 Drawing Sheets

FIG. 13

| VARIABLE | DESCRIPTION |
|---|---|
| Demand | DEMAND |
| t | COMMUNICATION ROUTE FOR DEMAND |
| h | PATH IN NETWORK |
| s | LINK IN NETWORK |
| b | BANDWIDTH TYPE (FOR EXAMPLE, ODU2, ODU3, OR ODU4) OF COMMUNICATION CHANNEL |
| d(t) | NUMBER OF USES OF COMMUNICATION ROUTE t |
| Cost(b) | COST OF COMMUNICATION CHANNEL WITH BANDWIDTH b |
| x(h, b) | NUMBER OF USES OF COMMUNICATION CHANNELS WITH BANDWIDTH b IN PATH h |
| T(Demand, t) | INDICATES "1" WHEN COMMUNICATION ROUTE t BELONGS TO DEMAND Demand; OTHERWISE INDICATES "0" (BINARY VALUE) |
| I(h, t) | INDICATES "1" WHEN PATH h IS INCLUDED IN COMMUNICATION ROUTE t; OTHERWISE INDICATES "0" (BINARY VALUE) |
| BW(b) | TOTAL OF BANDWIDTHS OF COMMUNICATION CHANNELS WITH BANDWIDTH b |
| Link(s, h) | INDICATES "1" WHEN LINK s IS INCLUDED IN PATH h; OTHERWISE INDICATES "0" (BINARY VALUE) |
| Demand_Cap(t) | BANDWIDTH OF COMMUNICATION ROUTE t |
| TotalDemandNum | TOTAL NUMBER OF DEMANDS |
| WavelengthLimit(s) | UPPER LIMIT FOR NUMBER OF WAVELENGTHS IN LINK s |

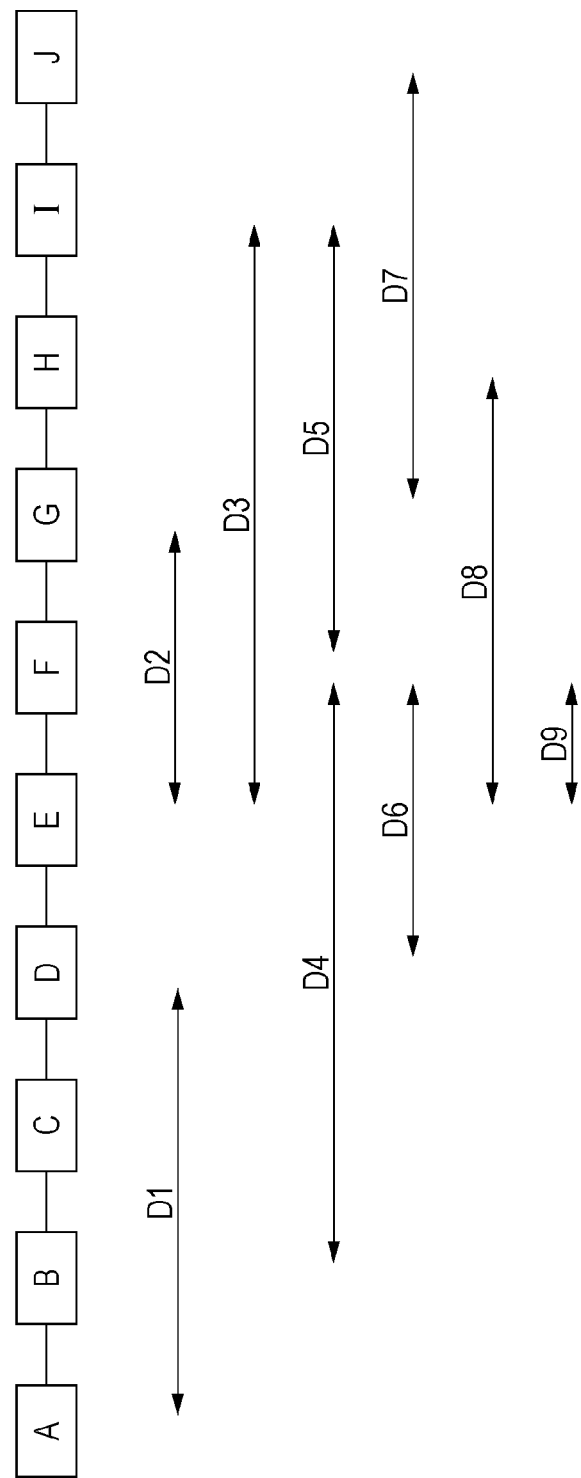

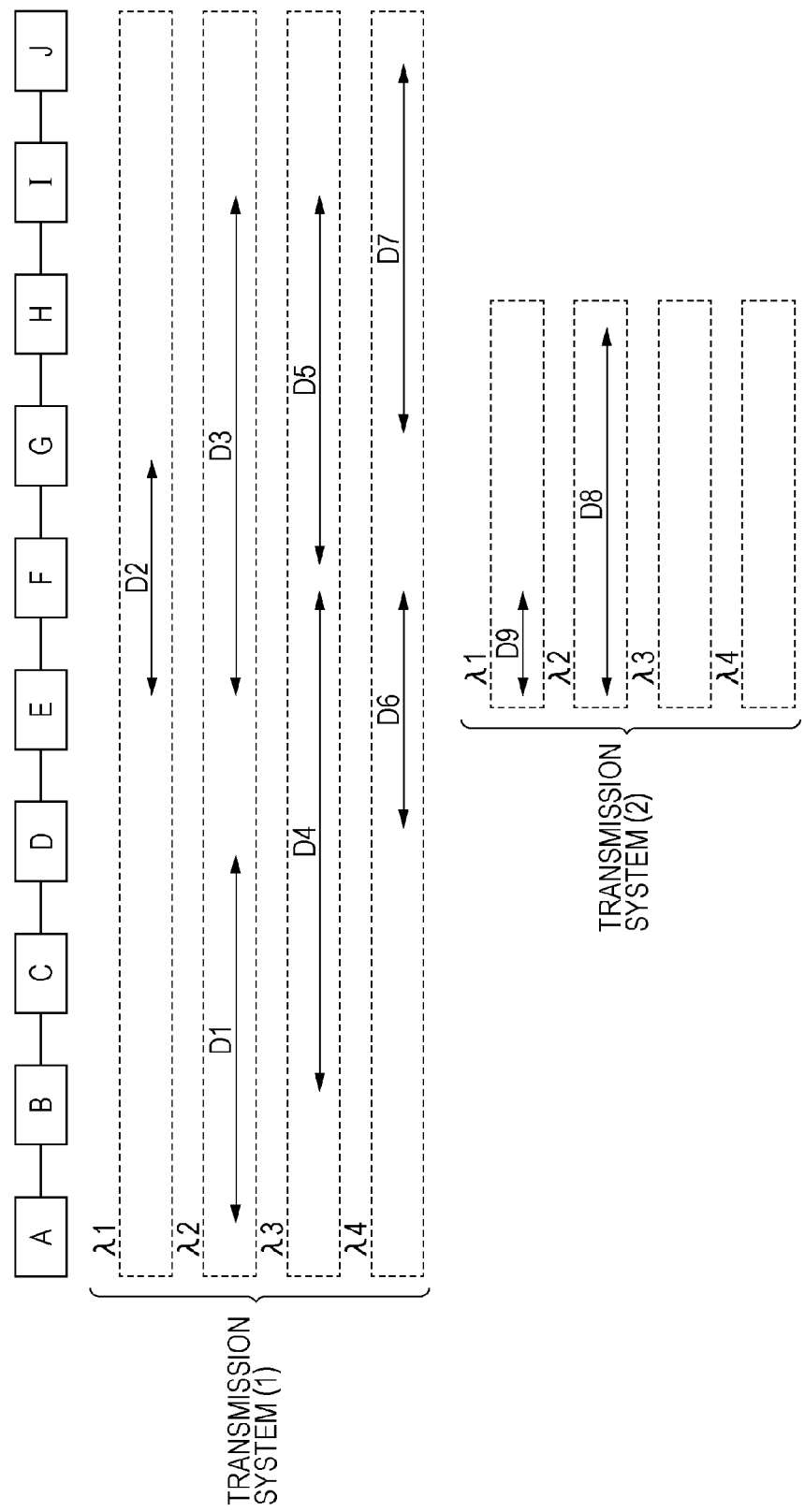

FIG. 18

| LINK | A-B | B-C | C-D | D-E | E-F | F-G | G-H | H-I | I-J |
|---|---|---|---|---|---|---|---|---|---|
| NUMBER OF PATHS | 1 | 2 | 2 | 2 | 6 | 4 | 4 | 3 | 1 |
| UPPER LIMIT FOR NUMBER OF TRANSMISSION SYSTEMS | 1 | 1 | 1 | 1 | 2 | 1 | 1 | 1 | 1 |
| CONGESTED LINK | NO | NO | NO | NO | YES | NO | NO | NO | NO |
| UNCONGESTED LINK | YES | YES | YES | YES | NO | YES | YES | YES | YES |
| HIGH-USAGE-RATE LINK | NO | NO | NO | NO | NO | YES | YES | YES | NO |
| CONGESTION-RELATED INDEX VALUE | 0 | 1 | 1 | 2 | — | 3 | 2 | 1 | 0 |
| PRIORITY | 7 | 5 | 6 | 4 | — | 1 | 2 | 3 | 8 |

FIG. 19

| VARIABLE | DESCRIPTION |
|---|---|
| k | IDENTIFIER OF COMMUNICATION CHANNEL |
| s | IDENTIFIER OF LINK |
| w | IDENTIFIER OF WAVELENGTH |
| x(w, k) | INDICATES "1" WHEN WAVELENGTH w is USED FOR COMMUNICATION CHANNEL k; OTHERWISE INDICATES "0" |
| Link(k, s) | INDICATES "1" WHEN COMMUNICATION CHANNEL k PASSES THROUGH LINK s; OTHERWISE INDICATES "0" |
| SystemNum(s) | NUMBER OF TRANSMISSION SYSTEMS AVAILABLE FOR LINK s |
| LambdaNo(w) | LABEL NO. OF WAVELENGTH w |

FIG. 21

| CURRENT NUMBER OF WAVELENGTHS | CURRENT NUMBER OF SYSTEMS | TARGET NUMBER OF SYSTEMS | TARGET NUMBER OF WAVELENGTHS |
|---|---|---|---|
| 4 | 1 | 1 | 4 |
| 4 | 2 | 1 | 3(=(4−1)×1) |
| 5 | 2 | 1 | 4(=4×1) |
| 6 | 2 | 1 | 4(=4×1) |
| 8 | 2 | 2 | 8 |
| 8 | 3 | 2 | 6(=(4−1)×2) |
| 9 | 3 | 2 | 8(=4×2) |

APPARATUS AND METHOD FOR DESIGNING A NETWORK TRANSMITTING WAVELENGTH MULTIPLEXED OPTICAL SIGNALS

CROSS-REFERENCE TO RELATED APPLICATION

This application is based upon and claims the benefit of priority of the prior Japanese Patent Application No. 2013-168332 filed on Aug. 13, 2013, the entire contents of which are incorporated herein by reference.

FIELD

The embodiment discussed herein is related to apparatus and method for designing a network transmitting wavelength multiplexed optical signals.

BACKGROUND

High-speed optical transmission systems are being standardized along with the growth in communication demand. For example, International Telecommunication Union Telecommunication Standardization Sector (ITU-T) Recommendation G.709 defines Optical Transport Network (OTN) technology with a transmission speed of about 2.5 to 100 Gbps.

Optical transmission in the OTN uses wavelength division multiplexing (WDM) technology to multiplex a plurality of optical signals each containing a user signal, thereby making it possible to realize large-capacity transmission. Examples of the client signals contained in the optical signals include Synchronous Digital Hierarchy (SDH) frames, Synchronous Optical NETwork (SONET) frames, and Ethernet (registered trademark) frames.

In a wavelength division multiplexing apparatus employing the WDM technology (hereinafter referred to as a "WDM apparatus"), optical transceivers called transponders or the like are provided for respective communication channels, and optical signals are input and output via the respective optical transceivers. Each WDM apparatus transmits a wavelength multiplexed optical signal (hereinafter referred to as a "multiplexed optical signal") obtained by multiplexing an optical signal input from the optical transceiver, together with an optical signal from another node, and transmits the multiplexed optical signal to another apparatus. Such an input of an optical signal from the optical transceiver is referred to as "insertion".

Also, the WDM apparatus demultiplexes an optical signal having a predetermined wavelength from a multiplexed optical signal from another apparatus and receives the demultiplexed optical signal via an optical transceiver. Such demultiplexing of an optical signal is herein referred to as "branching".

One example of the major costs of a network including WDM apparatuses is the number of communication channels established along paths in the network. The cost of a communication channel includes the cost of a pair of optical transceivers for performing communication through the communication channel.

Another example of the major costs is the number of WDM transmission systems. Each of the transmission systems is provided in the WDM apparatuses at a set of nodes that connect a link in the network, to transmit a wavelength multiplexing signal in which optical signals with different wavelengths are multiplexed. For example, when two optical signals with the same wavelength are transmitted through one link, at least two transmission systems are need to be provided for two opposite nodes that connect the link.

The cost of the transmission systems includes not only the cost of the transmission systems themselves but also the cost of certain floor areas in offices (that is, nodes) occupied by racks on which the transmission systems are mounted.

Thus, in network design, communication channel design and wavelength assignment design are performed based on a request for traffic between nodes. In the communication channel design, streams of traffic are assigned to communication channels so that the bandwidths of the streams of traffic are efficiently accommodated into the bandwidths of the communication channels to be established through paths in the network. In connection with the communication-channel assignment, for example, Japanese Laid-open Patent Publication No. 2013-90297 discloses a technology for performing communication channel design so that the cost of communication channels is minimized, by solving an integer programming problem.

In the wavelength assignment design, wavelengths are efficiently assigned to the communication channels so that the number of WDM systems is minimized. In connection with the wavelength assignment, for example, Japanese Laid-open Patent Publication No. 2010-199891 discloses a technology in which a preset number of routes are reserved as reserved optical paths, and reservation for assignment of routes and wavelengths is performed on each reserved optical path.

SUMMARY

According to an aspect of the invention, an apparatus performs a first process including: determining, in response to a plurality of demands each requesting traffic between a pair of nodes in a network in which one or more wavelength multiplexed optical signals are transmitted, a plurality of communication routes each providing a connection between the pair of nodes in the network, and estimating, for each link in the network, communication channels to be established in each communication route, in accordance with a wavelength constraint condition that a number of communication channels to be established be smaller than or equal to a first upper limit for a number of available optical signal wavelengths. The apparatus performs a second process including: assigning, for each link in the network, wavelengths of optical signals to be multiplexed into the one or more wavelength multiplexed optical signals, to the communication channels, based on a result of the estimating of the first process and in accordance with a system constraint condition that a number of optical signals that have an identical wavelength and are redundantly usable be smaller than or equal to a second upper limit for a number of available transmission systems each configured to transmit a wavelength multiplexed optical signal. The apparatus performs a third process including: determining, for each link in the network, a target number of wavelengths for reducing a required number of transmission systems that is required for accommodating the plurality of demands, based on a result of the estimating of the first process and a result of the assigning of the second process, and determining whether there is a possibility of reducing the required number of transmission systems, by determining whether the target number of wavelengths is achievable by at least one of a change in bandwidths of the communication channels and a change in the plurality of communication routes. Upon determining that there is a possibility of reducing the required number of transmission systems, the apparatus changes the wavelength constraint condition so that the first upper limit is defined as the target number of wavelengths and changes the system constraint condition so that the second upper limit is reduced, with respect to the each link, re-estimates the first communication channels in accordance with the changed wavelength constraint condition, and re-assigns wavelengths of optical signals to be multiplexed, based on a result of the re-estimating of the first process and in accordance with the changed system constraint condition.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 13 is a diagram illustrating variables used for an integer programming problem model constructed by a first processing unit, according to an embodiment;

FIG. 14 is a diagram illustrating an example of communication channels provided in a network, according to an embodiment;

FIG. 15 is a diagram illustrating an example of wavelengths assigned to communication channels illustrated in FIG. 14, according to an embodiment;

FIG. 18 is a diagram illustrating an example of a table illustrating design information regarding a network illustrated in FIG. 14, according to an embodiment;

FIG. 19 is a diagram illustrating an example of variables used for an integer programming problem model constructed by a second processing unit, according to an embodiment;

FIG. 21 is a diagram illustrating an example of a result of calculating a target number of wavelengths, according to an embodiment;

DESCRIPTION OF EMBODIMENT

In order to design a low-cost network, it is desirable to consider both communication channels and transmission systems. In this case, a conceivable method is, for example, to perform network design by performing, after communication channel design, wavelength assignment design based on a result of the communication channel design.

According to the above design method, however, since a result of the wavelength assignment design is not reflected in the communication channel design, it is difficult to obtain a design result in which both of the number of communication channels and the number of transmission systems are optimized.

Figure 1:
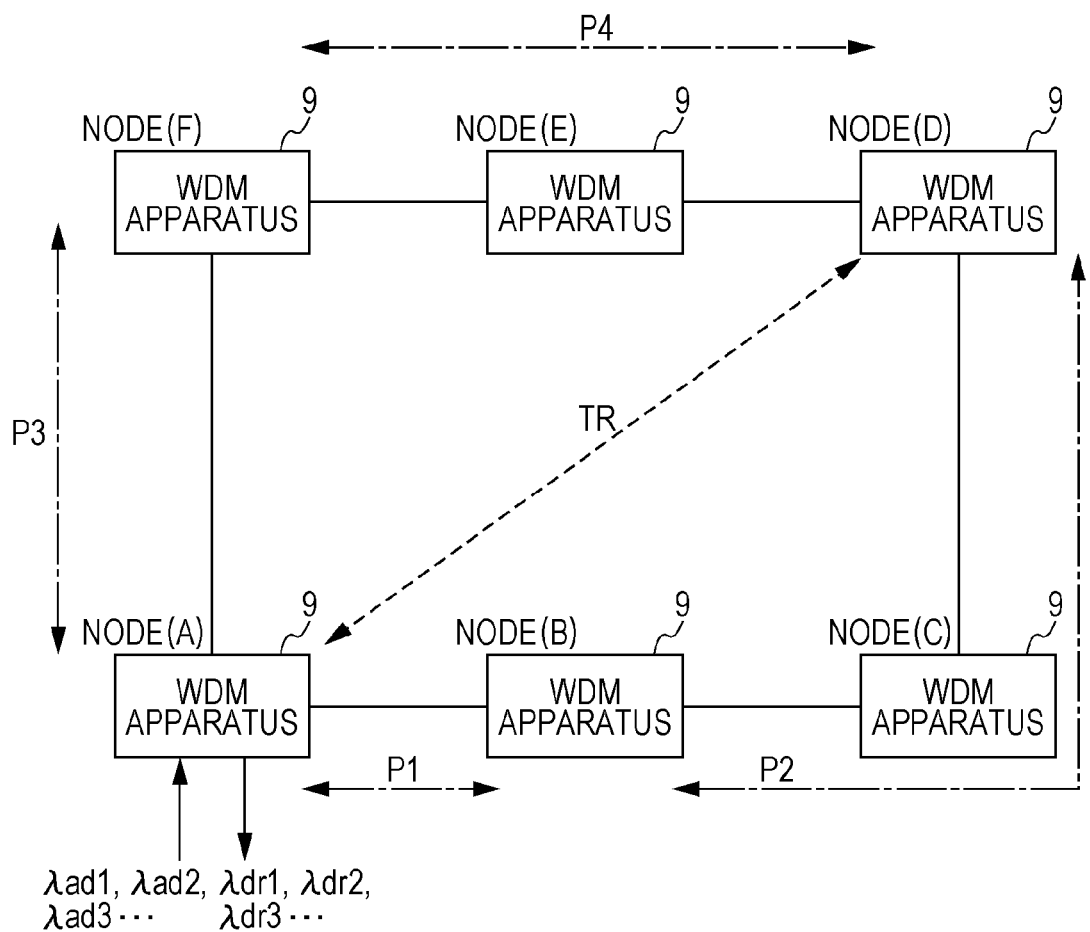
FIG. 1 is a diagram illustrating an example of a network, according to an embodiment.

FIG. 1 is a diagram illustrating an example of a network, according to an embodiment. This network is an example of a network to be designed. The network includes nodes (A) to (F) at which WDM apparatuses 9 are provided. The WDM apparatuses 9 at the nodes (A) to (F) are connected in a ring topology through optical fibers, which serve as transmission paths. In this example, the network topology is a ring type, but is not limited thereto, and may also be, for example, a mesh type.

Each WDM apparatus 9 multiplexes optical signals having mutually different wavelengths $\lambda ad1$, $\lambda ad2$, $\lambda ad3$, ... and transmits the resulting optical signal to the WDM apparatus 9 at its adjacent node as a multiplexed optical signal. The WDM apparatus 9 also demultiplexes optical signals having mutually different wavelengths $\lambda dr1$, $\lambda dr2$, $\lambda dr3$, ... from a multiplexed optical signal input from another node and outputs the resulting optical signals to a client-side network. Thus, in this network, an optical signal having an arbitrary wavelength may be inserted into one node and may also be branched from another node.

In communication channel design, in response to a request for traffic TR between predetermined nodes in the network, a communication route that provides a connection between the nodes is determined. In this example, the traffic TR is requested, for example, between the nodes (A) and (D) (see a dotted line).

By way of example, it is assumed that this network has paths P1 to P4 (see dashed-dotted lines). The paths P1 to P4 are transmission routes through which an optical signal having a predetermined wavelength is transmitted from when it is inserted into the WDM apparatus 9 until it is branched from another WDM apparatus 9. The path P1 is provided between the nodes (A) and (B), and the path P2 is provided between the nodes (B) and (D). The path P3 is provided between the nodes (A) and (F), and the path P4 is provided between the nodes (F) and (D).

In the communication channel design, a communication route for requested traffic is determined through selection of one or more paths. In this example, a route including the paths P1 and P2 and a route including the paths P3 and P4 are available as communication route candidates.

The network design involves communication channel design and wavelength assignment design. In the communication channel design, when the communication route is determined, communication channels to be established in the selected paths P1 to P4 are estimated. For example, a communication channel in the path P1 is established by performing setting so that, when the transmission direction is assumed to be a direction from the node (A) to the node (B), an optical signal having a predetermined wavelength is inserted into the WDM apparatus 9 at the node (A) and is branched from the WDM apparatus 9 at the node (B). A communication channel in the path P2 is established by performing setting so that, when the transmission direction is assumed to be a direction from the node (B) to the node (D), an optical signal having a predetermined wavelength is inserted into the WDM apparatus 9 at the node (B), passes through the WDM apparatus 9 at the node (C), and is branched from the WDM apparatus 9 at the node (D). In the following description, a state in which an optical signal passes through the WDM apparatus 9 without being inserted nor branched as in the case of the node (C) is referred to as "through".

When a route including the paths P1 and P2 is selected as a communication route for the traffic TR, the communication channel is switched at the node (B) from the communication channel established in the path P1 to the communication channel established in the path P2. Switching between communication channels in such a manner is hereinafter referred to as "grooming".

In the wavelength assignment design, communication channels designed in the communication channel design are assigned wavelengths of optical signals transmitted and received through the communication channels. One communication channel is assigned one wavelength, and the maximum number of usable wavelengths is determined for each link between the adjacent nodes in accordance with the number of transmission systems provided at the WDM apparatuses 9 at the nodes. For example, when the maximum number of wavelengths (the maximum number of optical signals) that can be multiplexed by one transmission system is assumed to be 40 and the WDM apparatuses 9 at a pair of nodes that provide a link therebetween are each provided with two transmission systems, the maximum number of wavelengths that can be used by the link is 80 (=40×2).

Figure 2:
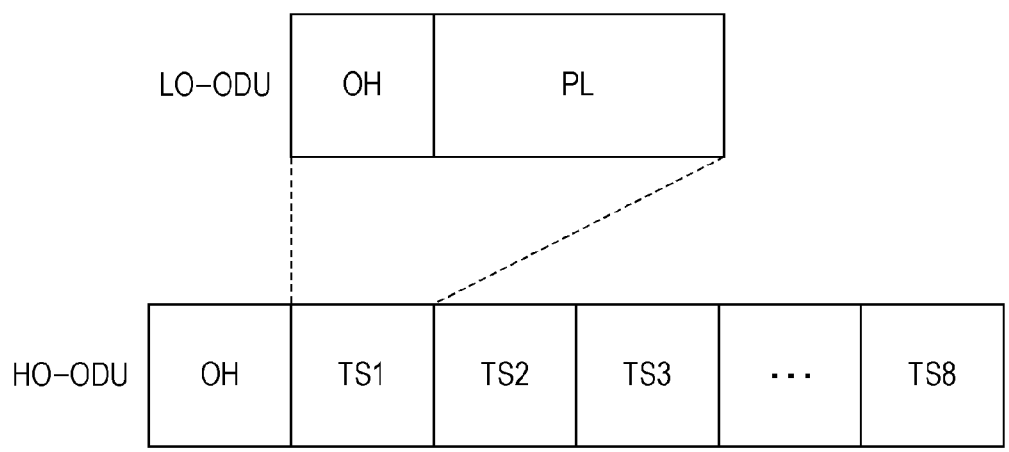
FIG. 2 is a diagram illustrating an example of a configuration of an optical signal, according to an embodiment.

FIG. 2 is a diagram illustrating an example of a configuration of an optical signal, according to an embodiment. The optical signal has, for example, a configuration used in the higher-order optical channel data unit (HO-ODU) specified in ITU-T Recommendation G.709. The HO-ODU has an overhead (OH) including predetermined control information and tributary slots (TSs) TS1 to TS8, which are logical channels.

Multiple types of transmission speed are available as the transmission speed of the HO-ODU. ITU-T Recommendation G.709 specifies ODU0 for 1.25 Gbps, ODU1 for 5 Gbps, ODU2 for 10 Gbps, ODU3 for 40 Gbps, ODU4 for 100 Gbps, and so on.

The HO-ODU has the number of TSs which corresponds to the transmission speed, that is, the bandwidth. For example, the number of TSs is 8 for an ODU2 bandwidth and is two for an ODU1 bandwidth. Each of TS1 to TS8 has a bandwidth of 1.25 Gbps (that is, an ODU0 bandwidth). The type of ODUn (n is a natural number) is referred to as a "bandwidth type" in the description below.

Thus, the HO-ODU is configure to contain a plurality of client signals via multiplexing of a plurality of LO-ODUs. The bandwidth of traffic to be requested is given as the bandwidth of a client signal. While an OTN defined by ITU-T Recommendation G.709 is described herein as an example of a transmission system for optical signals, the transmission system is not limited thereto.

As a bandwidth of a communication channel to be established in a path, multiple types are available in accordance with the bandwidth type of the HO-ODU. The bandwidth type of a communication channel affects the cost of an optical transceiver that transmits/receives the HO-ODU. Thus, in the communication channel design, the type and the number of bandwidths of communication channels are estimated so that the cost of the communication channels used in an entire network is minimized. Although a case in which the bandwidth types of communication channels are 10 Gbps (corresponding to ODU2) and 100 Gbps (corresponding to ODU4) is described in the embodiment, the bandwidth types are not limited to this example.

Figure 3:
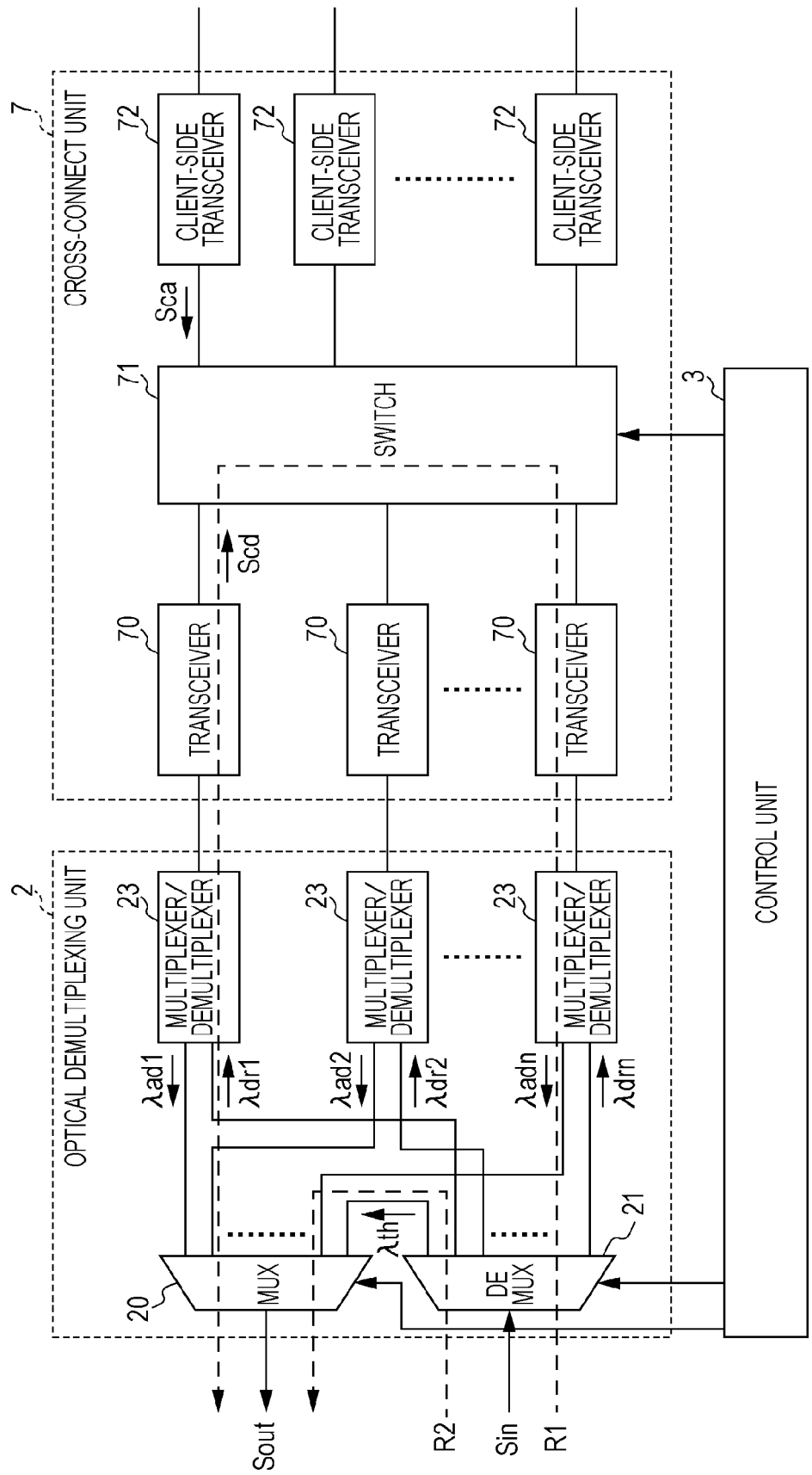
FIG. 3 is a diagram illustrating an example of a functional configuration of a WDM apparatus, according to an embodiment.

FIG. 3 is a diagram illustrating an example of a functional configuration of a WDM apparatus, according to an embodiment. The WDM apparatus 9 includes a cross-connect unit 7, an optical demultiplexing unit 2, and a control unit 3.

The cross-connect unit 7 performs conversion and switching between client signals and HO-ODUs (that is, optical signals). The cross-connect unit 7 includes a plurality of optical transceivers 70, a switch 71, and a plurality of client-side transceivers 72.

Each client-side transceiver 72 outputs a client signal Sca, received from a client-side network, to the switch 71. The switch 71 outputs the client signal Sca to the optical transceiver 70 corresponding to a setting performed by the control unit 3.

The plurality of optical transceivers 70 output/input optical signals having different wavelengths to/from the optical demultiplexing unit 2. The optical transceiver 70 accommodates the client signal Sca, input from the switch 71, into an HO-ODU, converts the resulting signal into an optical signal, and outputs the optical signal to the optical demultiplexing unit 2. Different types of optical transceiver 70 are available depending on the bandwidth type.

The optical transceiver 70 also converts the optical signal, input from the optical demultiplexing unit 2, into an electrical signal, retrieves a client signal Scd from the HO-ODU, and outputs the client signal Scd to the switch 71. The switch 71 outputs the client signal Scd to the client-side transceiver 72 corresponding to a setting performed by the control unit 3. The client-side transceiver 72 transmits the client signal Scd, input from the switch 71, to the client-side network.

In accordance with a setting performed by the control unit 3, the switch 71 exchanges the client signals Sca and Scd between the optical transceivers 70 and the client-side transceivers 72. When a grooming setting is performed, the switch 71 turns back the client signal Scd, input from the optical transceiver 70, to another optical transceiver 70 (see route R1).

The optical demultiplexing unit 2 demultiplexes, for each wavelength, a multiplexed optical signal transmitted from the adjacent node. The optical demultiplexing unit 2 also wavelength-multiplexes optical signals to be transmitted to the adjacent node, and outputs the resulting signal to the transmission path as a multiplexed optical signal. The optical demultiplexing unit 2 includes a multiplexer (MUX) 20, a demultiplexer (DEMUX) 21, and a plurality of optical multiplexers/demultiplexers 23.

In accordance with a setting performed by the control unit 3, the demultiplexer 21 demultiplexes a multiplexed optical signal Sin, transmitted from the adjacent node, into optical signals for respective wavelengths and outputs, to the optical multiplexers/demultiplexers 23, optical signals of the wavelengths $\lambda dr1$ to $\lambda drn$ for which a branching setting has been performed. The demultiplexer 21 also outputs, to the multiplexer 20, optical signals of one or more wavelengths $\lambda th$ for which a through setting has been performed. The demultiplexer 21 is implemented by using, for example, a wavelength selective switch, but is not limited thereto, and may also be implemented by using another optical device, such as an arrayed waveguide grating.

In accordance with a setting performed by the control unit 3, the multiplexer 20 multiplexes optical signals of wavelengths $\lambda ad1$ to $\lambda adn$ for which an insertion setting has been performed and outputs the optical signals to transmission paths as a multiplexed optical signal Sout for transmission to the adjacent node. The optical signals of wavelengths $\lambda ad1$ to $\lambda adn$ are input to the multiplexer 20 from the optical multiplexers/demultiplexers 23.

The optical multiplexers/demultiplexers 23 output the optical signals of wavelengths $\lambda dr1$ to $\lambda drn$, input from the demultiplexer 21, to the optical transceivers 70, respectively. The optical multiplexers/demultiplexers 23 also output the optical signals of wavelengths $\lambda d1$ to $\lambda adn$, input from the optical transceivers 70, to the multiplexer 20. Each optical multiplexer/demultiplexer 23 is implemented by using, for example, a WDM coupler, but is not limited thereto, and may also be implemented by using another optical device, such as an optical circulator.

With this configuration, an optical signal to be branched is demultiplexed from a multiplexed optical signal by the demultiplexer 21 and is input to the optical transceiver 70 via the optical multiplexer/demultiplexer 23. At termination nodes of requested traffic (the nodes (A) and (D) in the case in FIG. 1), an optical signal to be branched is further input to the client-side transceiver 72 via the switch 71 and is then transmitted to the client-side network.

On the other hand, an optical signal to be inserted is input to the multiplexer 20 from the optical transceiver 70 via the optical multiplexer/demultiplexer 23. At termination nodes of requested traffic, an optical signal to be inserted is input to the optical transceiver 70 from the client-side transceiver 72 via the switch 71.

When grooming is performed, a client signal passes through the route R1 illustrated in FIG. 3. That is, an optical signal containing a client signal subjected to the grooming is input to the optical transceiver 70 via the demultiplexer 21 and the optical multiplexer/demultiplexer 23 as a signal to be branched. The client signal is then retrieved from the HO-ODU, is input to the switch 71, is turned back at the switch 71, and is input to another optical transceiver 70. When the wavelength of an optical signal is not changed, the switch 71 may also turn back the client signal to the optical transceiver 70 from which the optical signal was input.

The turned back client signal is contained in an HO-ODU again by the optical transceiver 70 and is converted into an optical signal. The optical signal is then input to the multiplexer 20 via the optical multiplexer/demultiplexer 23 as a signal to be inserted and is output to the transmission path. When the grooming is performed, an optical signal is temporarily branched and is then inserted again. Thus, in this case, one or two optical transceivers 70 are used.

In contrast, when an optical signal passes through the WDM apparatus 9 without being inserted or branched thereat, the optical signal passes through a route R2 illustrated in FIG. 3. That is, an optical signal that passes through the WDM apparatus 9 without being inserted or branched thereat is input directly to the multiplexer 20 from the demultiplexer 21 without being converted into an electrical signal by the optical transceiver 70. Thus, in this case, the optical transceiver 70 is not used.

The control unit 3 includes, for example, a processor, such as a CPU, and performs setting for the multiplexer 20, the demultiplexer 21, and the switch 71. The control unit 3 obtains setting information, for example, by communicating with a network management apparatus (not illustrated).

Although one multiplexer 20 and one demultiplexer 21 are illustrated in FIG. 3, the multiplexers 20 and the demultiplexers 201 are provided in a number that corresponds to the number of transmission systems for pathways (transmission paths connected to the adjacent node). The transmission system will be described below in conjunction with an example.

Figure 4:
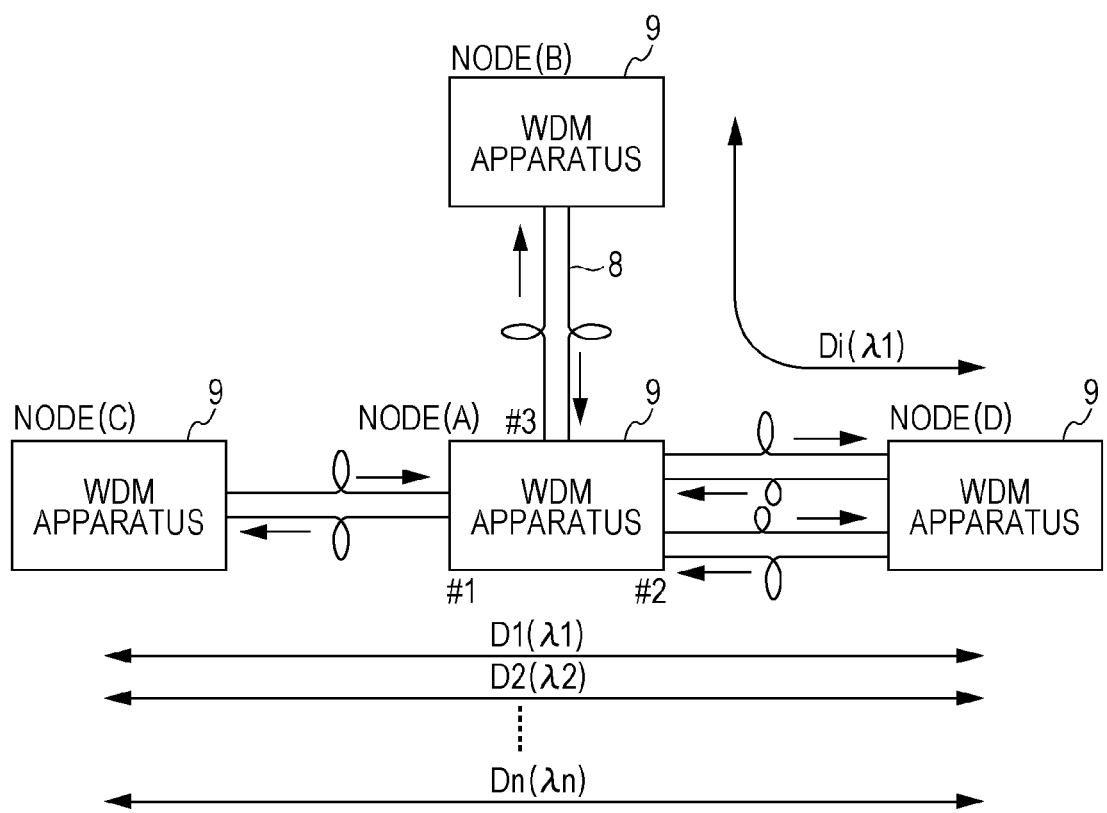
FIG. 4 is a diagram illustrating an example of assignment of wavelengths to a network, according to an embodiment.

FIG. 4 is a diagram illustrating an example of assignment of wavelengths to a network, according to an embodiment. In the network in this example, paths are partially overlapped, and two communication channels that use the same wavelength are provided.

This network includes nodes (A) to (D), and the WDM apparatuses 9 are provided at the respective nodes (A) to (D). The WDM apparatus 9 at the node (A) is connected to the WDM apparatuses 9 at the other nodes (B) to (D) through optical fibers 8, which serve as transmission paths. Thus, the WDM apparatus 9 at the node (A) has a pathway #1 connected to the WDM apparatus 9 at the node (C), a pathway #2 connected to the WDM apparatus 9 at the node (D), and a pathway #3 connected to the WDM apparatus 9 at the node (B).

It is assumed that, in this network, communication channels D1 to Dn that pass through the nodes (C), (A), and (D) are provided, and wavelengths $\lambda 1$ to $\lambda n$ are assigned to the communication channels D1 to Dn, respectively. When the wavelengths $\lambda 1$ to Xn are assumed to be all wavelengths that are available for being multiplexed into a multiplexed optical signal, the number of wavelengths between the nodes (A) and (D) (that is, the pathway #2) is not sufficient, when a new path Pi that passes through the nodes (B), (A), and (D) is to be provided.

In order to compensate for the insufficient number of wavelengths, duplicated transmission paths are provided between the WDM apparatus 9 at the node (A) and the WDM apparatus 9 at the node (D). That is, the WDM apparatus 9 at the node (A) and the WDM apparatus 9 at the node (D) are connected through two pairs of optical fibers 8. In this example, multiplexed optical signals are transmitted in two directions through each pair of optical fibers 8 (see arrows in FIG. 4). However, unlike the case in this example, a single-core bidirectional system in which multiplexed optical signals are transmitted through a single optical fiber 8 may also be employed.

Figure 5:
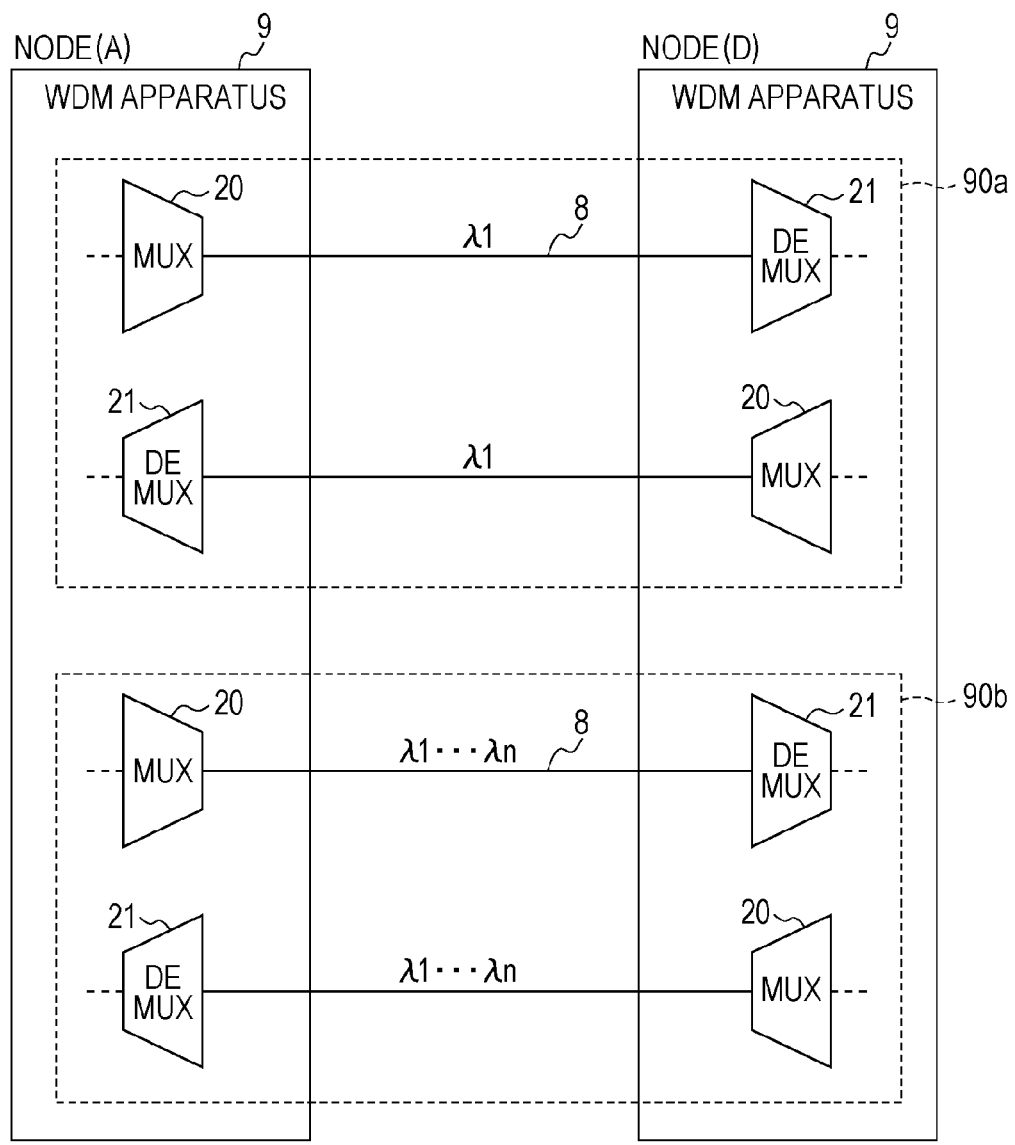
FIG. 5 is a diagram illustrating an example of a configuration of transmission systems, according to an embodiment.

Not only the transmission paths, but also the transmission system for transmitting multiplexed optical signals is made redundant at the WDM apparatus 9 at the node (A) and the WDM apparatus 9 at the node (D). FIG. 5 is a diagram illustrating an example of a configuration of a transmission system, according to an embodiment.

The WDM apparatuses 9 at the nodes (A) and (D) are each provided with two transmission systems 90a and 90b. Each of the two transmission systems 90a and 90b includes two sets of multiplexers 20 and demultiplexers 21. The multiplexer 20 and demultiplexer 21 of each set are connected through the optical fiber 8. A multiplexed optical signal is generated by the multiplexer 20, is transmitted to the demultiplexer 21 at the adjacent node through an optical fiber 8, and is demultiplexed into optical signals for respective wavelengths.

One transmission system 90a transmits optical signals of a wavelength λ1 in two directions, and the other transmission system 90b transmits optical signals of wavelengths λ1, . . . , λn, that is, wavelength multiplexed optical signals, in two directions. Thus, since it is possible to transmit two different multiplexed optical signals between the WDM apparatuses 9 at the nodes (A) and (D), two different communication channels D1 and Di that use the same wavelength λ1 may be established, as illustrated in FIG. 4.

A network design apparatus according to the embodiment performs, for each link in the network, the communication channel design in accordance with a wavelength constraint condition that the number of communication channels to be established be smaller than or equal to an upper limit for the number of usable optical signal wavelengths. The network design apparatus also performs, for each link in the network, the wavelength assignment design in accordance with a system constraint condition that the number of optical signals having the same wavelength and redundantly usable be smaller than or equal to an upper limit for the number of transmission systems that are required to be operated. Then, based on results of the communication channel design and the wavelength assignment design, the network design apparatus sets a target value for the number of wavelengths for reducing the number of transmission systems, and checks whether or not a reduction is possible, and feeds back a result of the checking to the communication channel design and the wavelength assignment design to perform the design again.

Figure 6:
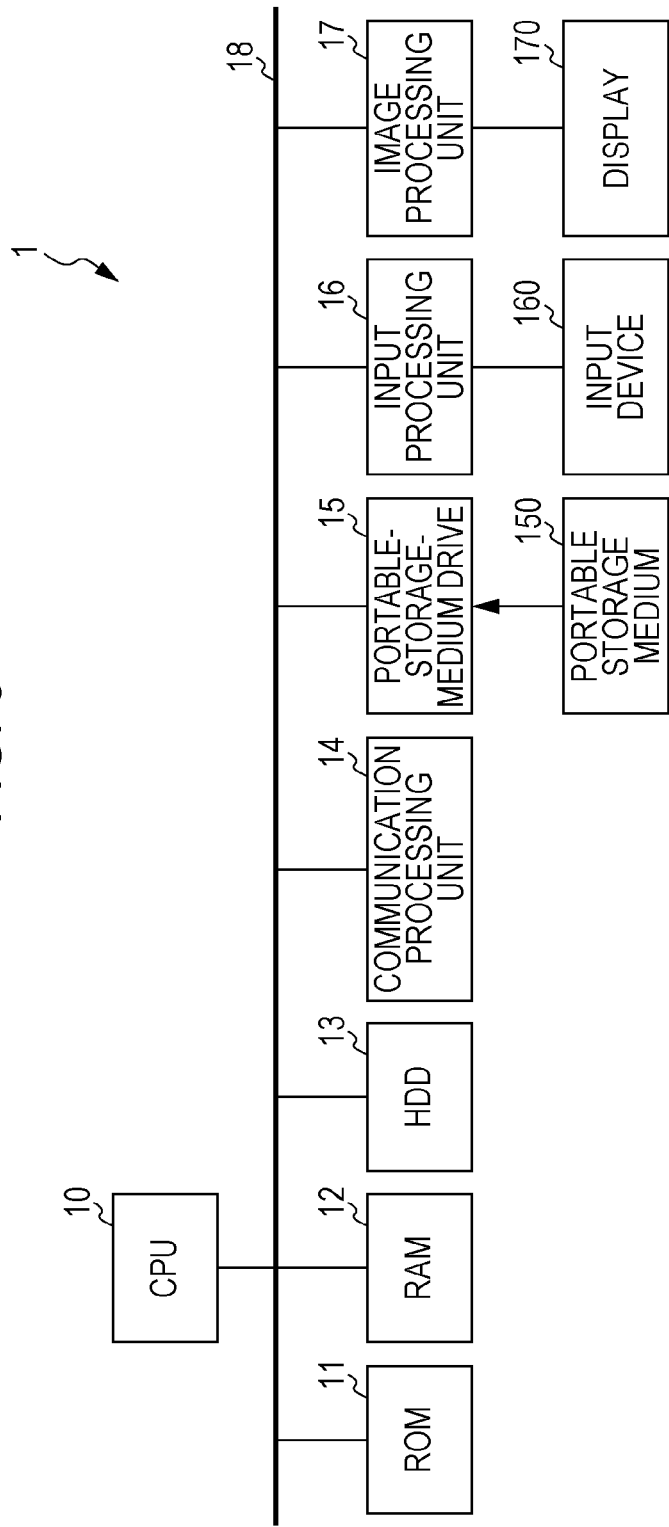
FIG. 6 is a diagram illustrating an example of a configuration of a network design apparatus, according to an embodiment.

FIG. 6 is a diagram illustrating an example of a configuration of a network design apparatus, according to an embodiment. A network design apparatus 1 is, for example, a computer apparatus such as a server. The network design apparatus 1 includes a CPU 10, a read-only memory (ROM) 11, a random access memory (RAM) 12, an HDD 13, a communication processing unit 14, a portable-storage-medium drive 15, an input processing unit 16, and an image processing unit 17.

The CPU 10 is a computational processor and performs network design processing in accordance with a network design program. The CPU 10 is communicably connected to the aforementioned elements 11 to 17 through a bus 18. The network design apparatus 1 is not limited to an apparatus that operates on software. The CPU 10 may also be replaced with other hardware, such as an integrated circuit for a specific application.

The RAM 12 is used as a working memory for the CPU 10. The ROM 11 and the HDD 13 are used to store therein, for example, the network design program, which causes the CPU 10 to operate. The communication processing unit 14 is, for example, a network card and communicates with external apparatuses through a network, such as a local area network (LAN).

The portable-storage-medium drive 15 is a device that writes information to and reads information from a portable storage medium 150. Examples of the portable storage medium 150 include a Universal Serial Bus (USB) memory, a recordable compact disc (CD-R), and a memory card.

The network design apparatus further includes an input device 160 for performing an operation for inputting information and a display 170 for displaying images. The input device 160 includes, for example, a keyboard, a mouse, and so on. Information input using the input device 160 is output to the CPU 10 via the input processing unit 16. The display 170 is, for example, a liquid-crystal display that displays images. Image data from the CPU 10 is output and displayed on the display 170 via the image processing unit 17. The input device 160 and the display 170 may also be replaced with a device, such as a touch panel having those functions.

The CPU 10 executes programs stored in the ROM 11, the HDD 13, or the like or programs read from the portable storage medium 150 by the portable-storage-medium drive 15. The programs include not only an operating system (OS) but also the aforementioned network design program. The programs may also include a program downloaded via the communication processing unit 14.

Figure 7:
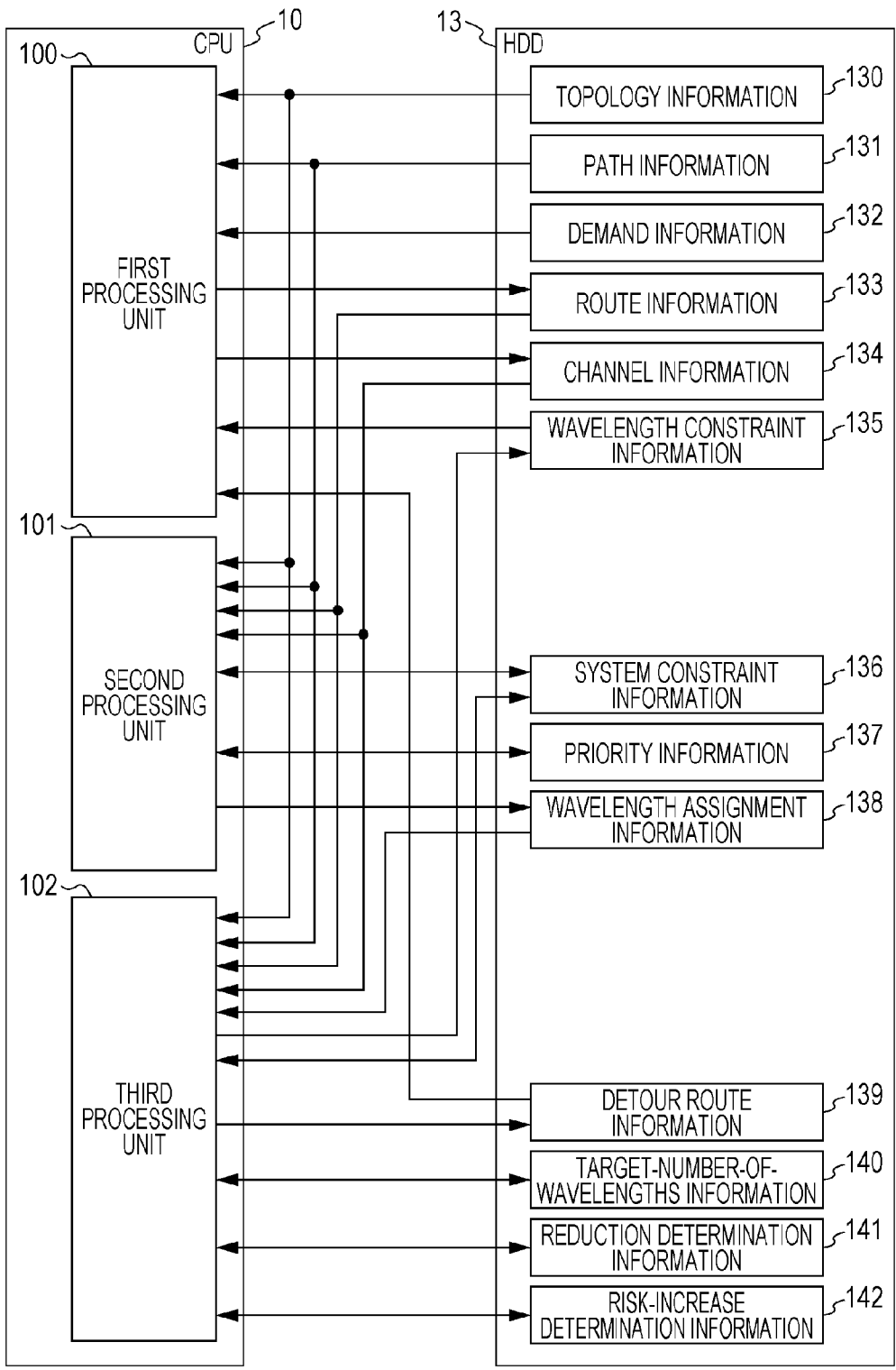
FIG. 7 is a diagram illustrating an example of a functional configuration realized by a CPU and information stored in a HDD, according to an embodiment.

Upon executing the network design program, the CPU 10 realizes multiple functions. FIG. 7 is a diagram illustrating an example of a functional configuration realized by the CPU 10 and information stored in the HDD 13, according to an embodiment.

The CPU 10 includes a first processing unit 100, a second processing unit 101, and a third processing unit 102. In connection with the first to third processing units 100 to 102, the HDD 13 also stores therein topology information 130, path information 131, demand information 132, route information 133, channel information 134, wavelength constraint information 135, system constraint information 136, priority information 137, and wavelength assignment information 138. The HDD 13 further stores therein detour route information 139, target-number-of-wavelengths information 140, reduction determination information 141, and risk-increase determination information 142. The storing of the information 130 to 142 is not limited to the HDD 13 and may also be the ROM 11 or the portable storage medium 150.

The topology information 130 is information indicating a topology of a network to be designed, that is, connection relationships between nodes via a link, as illustrated in FIG. 1. The topology information 130 is composed, for example, by associating identifiers of a pair of nodes connected through each link in the network with an identifier of the link.

The path information 131 is information indicating a plurality of paths set in the network. The path information 131 includes, for example, identifiers of multiple pairs of termination nodes of multiple paths, and identifiers of one or more links that provide connections between the termination nodes.

The demand information 132 is information indicating the contents of requests for multiple streams of traffic in the network. The demand information 132 indicates a bandwidth used for each communication between a pair of nodes in the network with respect to each stream of traffic to be requested. A request for each stream of traffic is referred to as a "demand" in the following description. The topology information 130, the path information 131, and the demand information 132 may also be externally obtained, for example, via the communication processing unit 14, the portable storage medium 150, or the input device 160.

The first processing unit 100 performs communication channel design. The first processing unit 100 reads the topology information 130, the path information 131, and the demand information 132 from the HDD 13, and determines a communication route corresponding to a request for traffic, based on the read information. In this case, the first processing unit 100 determines a communication route by selecting one or more paths provided between a pair of nodes in the network corresponding to a demand.

The first processing unit 100 also estimates communication channels that are to be established in each of one or more paths included in the determined communication route. More specifically, the first processing unit 100 estimates, for each link in the network, the number of communication channels for the bandwidth types (ODU2 and ODU4) in accordance with the wavelength constraint condition that the number of communication channels to be established be smaller than or equal to the upper limit for the number of available optical signal wavelengths. In this case, the first processing unit 100 reads the upper limit for the number of wavelengths from the HDD 13 as the wavelength constraint information 135. The wavelength constraint information 135 is changed in feedback processing performed by the third processing unit 102, as described below.

Also, when the detour route information 139 is generated in the feedback processing performed by the third processing unit 102, the first processing unit 100 determines a communication route for the demand, by adding a detour route indicated by the detour route information 139 to communication route candidates. With respect to each demand, the first processing unit 100 generates, as a design result, route information 133 indicating the determined communication route and channel information 134 indicating the bandwidths and the number of estimated communication channels, and writes the route information 133 and the channel information 134 to the HDD 13. Details of the processing performed by the first processing unit 100 are described later.

The second processing unit 101 reads the topology information 130, the path information 131, the route information 133, and the channel information 134 from the HDD 13, and performs wavelength assignment design, based on the read information. Based on a result of the estimation performed by the first processing unit 100, the second processing unit 101 assigns wavelengths of optical signals to be multiplexed into a multiplexed optical signal, to communication channels. More specifically, the second processing unit 101 assigns, for each link in the network, the wavelengths to the communication channels in accordance with a system constraint condition that the number of optical signals having the same wavelength and redundantly usable be smaller than or equal to the upper limit for the number of transmission systems provided for transmitting the wavelength multiplexed optical signal.

Based on the number of communication channels counted for each link, the second processing unit 101 determines the upper limit for the number of transmission systems and writes the determined upper-limit number to the HDD 13 as the system constraint information 136. The system constraint information 136 is changed in the feedback processing performed by the third processing unit 102, as described below.

When the wavelength assignment fails, that is, when a solution for an integer programming problem described below is not obtained, the second processing unit 101 relaxes the system constraint condition in accordance with the priority information 137 (that is, increases the upper limit for the number of transmission systems) and executes the wavelength assignment again. The second processing unit 101 determines the priority information 137, based on the number of wavelengths used for each link. With this arrangement, the system constraint condition for a link for which the priority indicated by the priority information 137 is higher is relaxed with higher priority.

The second processing unit 101 generates, as a design result, wavelength assignment information 138 indicating the wavelengths assigned to the respective communication channels and writes the design result to the HDD 13. Details of the processing performed by the second processing unit 101 are described later.

The third processing unit 102 reads, from the HDD 13, the topology information 130, the path information 131, the route information 133, the channel information 134, the system constraint information 136, and the wavelength assignment information 138, and feeds back the design result to the first and second processing units 100 and 101, based on the read information. Based on the result of the estimation performed by the first processing unit 100 and the result of the assignment performed by the second processing unit 101, the third processing unit 102 determines, for each link in the network, a target value for the number of wavelengths for reducing the number of transmission systems (the target number is hereinafter referred to as the "target number of wavelengths"). The third processing unit 102 writes the target number of wavelengths for each link to the HDD 13 as the target-number-of-wavelengths information 140.

The third processing unit 102 also determinates, for each link in the network, whether there is a possibility of reducing the number of transmission systems required for accommodating the demands (hereinafter also referred to as the "required number of transmission systems" or the "required number of systems"), by determining whether the target number of wavelengths is achieved by a change in the bandwidths of the communication channels and a change in the communication routes. In this case, the third processing unit 102 calculates the number of wavelengths (hereinafter referred to as a "first reduced number of wavelengths") that are reduced by changing a narrowband (for example, ODU2) communication channel to a broadband (for example, ODU4) communication channel so as to accommodate the bandwidths of multiple demands into one bandwidth.

The third processing unit 102 also calculates the number of wavelengths (hereinafter referred to as a "second reduced number of wavelengths") that are reduced by changing a path as a route of a communication channel to a path that bypasses that link. The third processing unit 102 writes the detour route, obtained by the change, to the HDD 13 as the detour route information 139. The detour route information 139 is fed back to the first processing unit 100 and is used as a communication route candidate. The detour route information 139 includes not only information on the detour route but also identifiers of links that are available as a detour route.

The third processing unit 102 compares, for each link, the total of the first reduced number of wavelengths and the second reduced number of wavelengths with the target number of wavelengths, to thereby determine whether there is a possibility of reducing the required number of transmission systems. The third processing unit 102 writes, for each link, the first reduced number of wavelengths, the second reduced number of wavelengths, and a determination result of the possibility of reducing the required number of transmission systems to the HDD 13 as the reduction determination information 141.

Upon determining that there is a possibility of reducing the required number of transmission systems, the third processing unit 102 changes, for that link, the wavelength constraint condition, that is, the wavelength constraint information 135, so that the upper limit for the number of wavelengths is the target number of wavelengths. In this case, the third processing unit 102 further changes the system constraint condition, that is, the system constraint information 136, so that the upper limit for the number of transmission systems is reduced.

The first processing unit 100 estimates the communication channels again in accordance with the changed wavelength constraint condition. Also, based on a result of the estimation performed by the first processing unit 100 again, the second processing unit 101 performs the wavelength assignment again in accordance with the changed system constraint condition. Since the third processing unit 102 feeds back the design result to the first processing unit 100 and the second processing unit 101, as described above, it is possible to design a network in which both the number of communication channels and the number of transmission systems are reduced.

Also, upon determining that there is no possibility of reducing the required number of transmission systems, the third processing unit 102 determines whether there is a risk of increasing the required number of transmission systems, based on the number of optical signal wavelengths that are increased through use of that link for a detour route of another link. More specifically, the third processing unit 102 determines whether there is a risk of increasing the required number of transmission systems as a result of re-execution of the estimation processing performed by the first processing unit 100 and the assignment processing performed by the second processing unit 101. The third processing unit 102 writes a result of the determination of the risk of increasing the required number of transmission systems for each link to the HDD 13 as the risk-increase determination information 142.

Upon determining that there is a risk of increasing the required number of transmission systems, the third processing unit 102 changes, for that link, the wavelength constraint condition, that is, the wavelength constraint information 135, so that the upper limit for the number of wavelengths is a maximum number allowed in order to inhibit an increase in the required number of transmission systems. In this case, the third processing unit 102 does not change the system constraint condition, that is, the system constraint information 136, so that the upper limit for the number of transmission systems is maintained.

The first processing unit 100 adds the detour route to communication route candidates, determines a communication route, and estimates communication channels again in accordance with the changed wavelength constraint condition. Based on the result of the estimation performed by the first processing unit 100 again, the second processing unit 101 performs wavelength assignment again in accordance with the system constraint condition. By feeding back the design result to the first processing unit 100 and the second processing unit 101, as described above, the third processing unit 102 inhibits an increase in the number of communication channels and the required number of transmission systems, caused by the design processing performed again.

Figure 8:
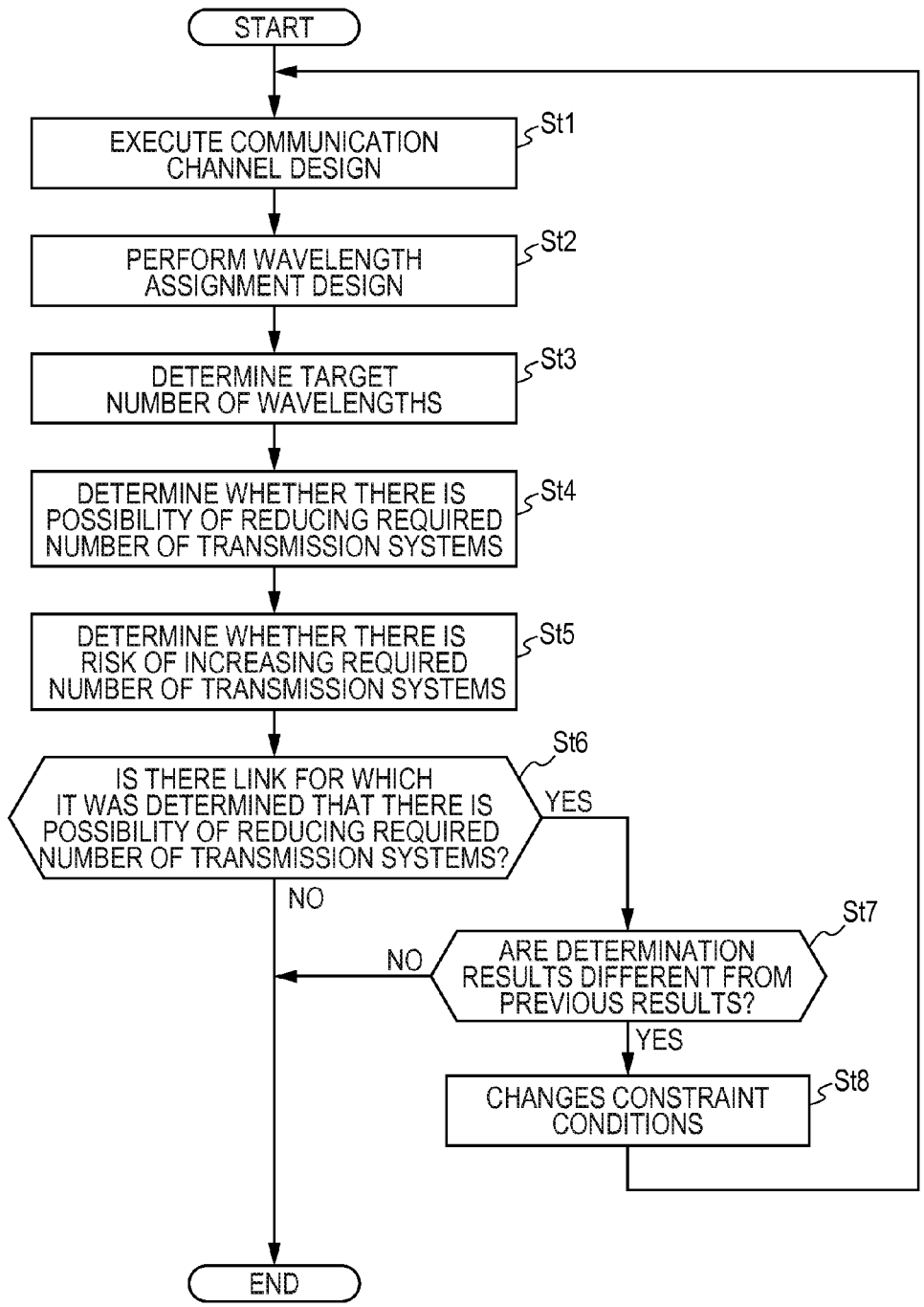
FIG. 8 is a diagram illustrating an example of an operational flowchart for a network design method, according to an embodiment.

The processing performed by the CPU 10 will be described next. FIG. 8 is a diagram illustrating an example of an operational flowchart for a network design method, according to an embodiment.

(Communication Channel Design)

Figure 9:
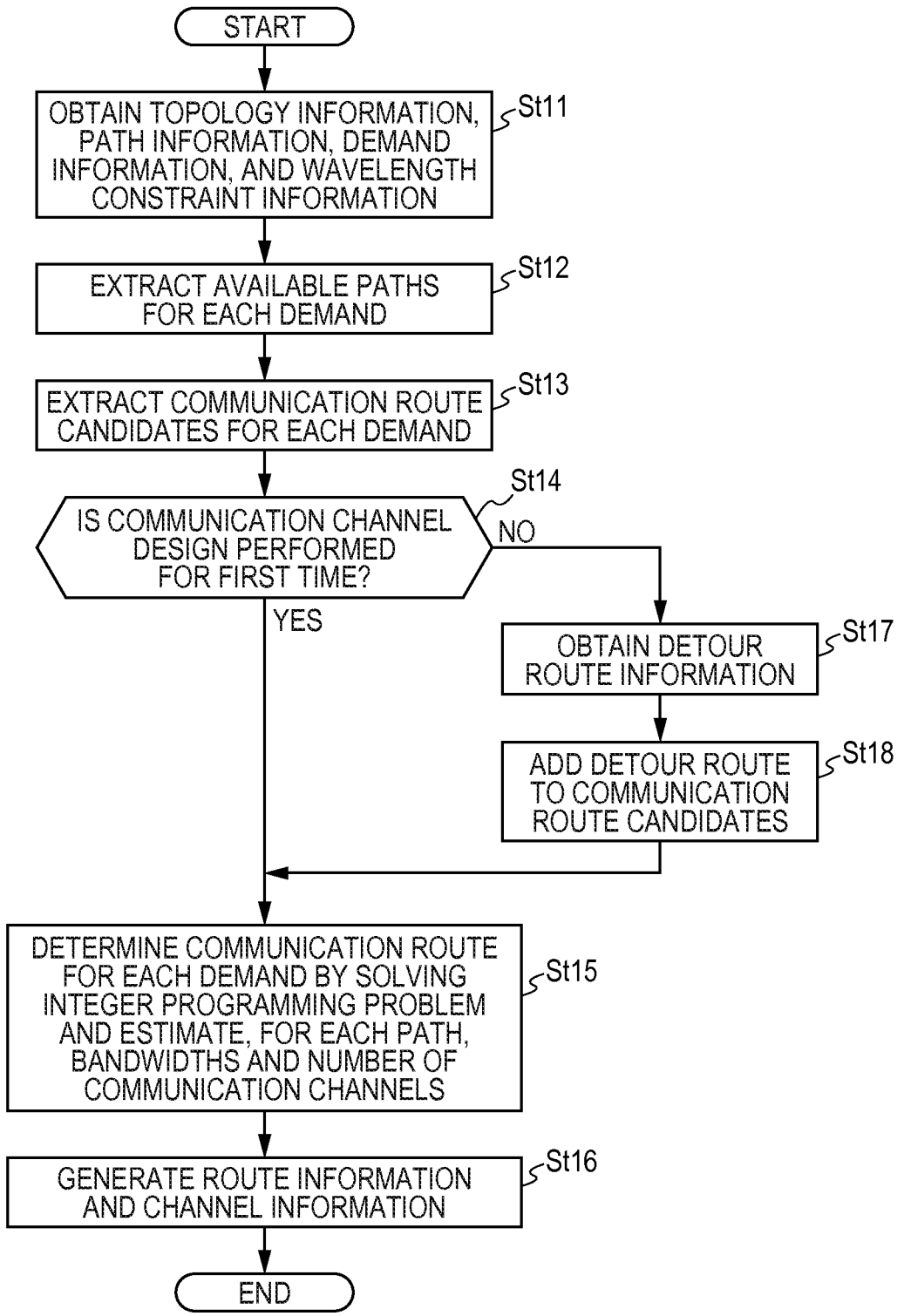
FIG. 9 is a diagram illustrating an example of an operational flowchart for communication channel design, according to an embodiment.

First, in step St1, the first processing unit 100 executes communication channel design. FIG. 9 is a diagram illustrating an example of an operational flowchart for communication channel design, according to an embodiment. In step St11, the first processing unit 100 obtains the topology information 130, the path information 131, the demand information 132, and the wavelength constraint information 135 from the HDD 13.

Figure 10:
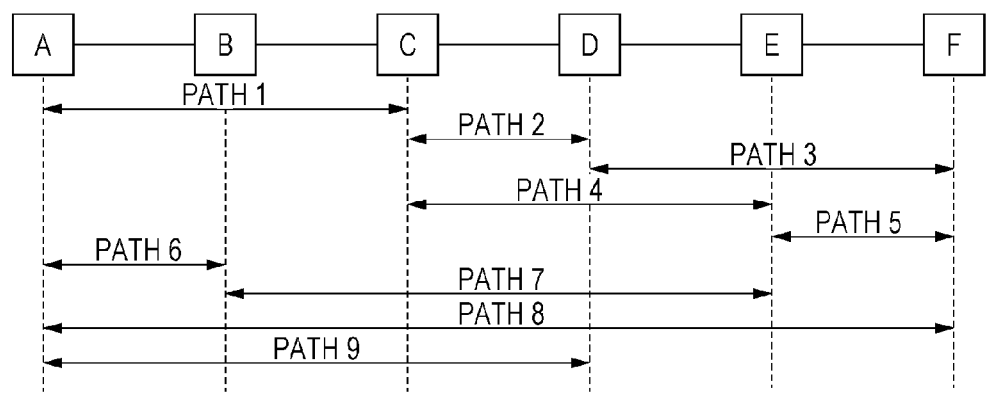
FIG. 10 is a diagram illustrating an example of paths provided in a network, according to an embodiment.

Next, in step St12, the first processing unit 100 extracts paths available for each demand. FIG. 10 is a diagram illustrating an example of paths provided in a network, according to an embodiment. For convenience of description, FIG. 10 illustrates a simple network in which nodes A to F are connected in series, and a pair of nodes corresponding to a demand is assumed to be nodes A and F.

The first processing unit 100 extracts, from one or more paths provided in the network, a plurality of paths 1 to 9 that exist between the nodes A and F corresponding to the demand. That is, paths 1 to 9 are extracted as routes each capable of becoming at least a part of communication routes that provide connections between the nodes A and F. For example, path 1 provides a connection between nodes A and C, and path 2 provides a connection between nodes C and D.

Figure 11:
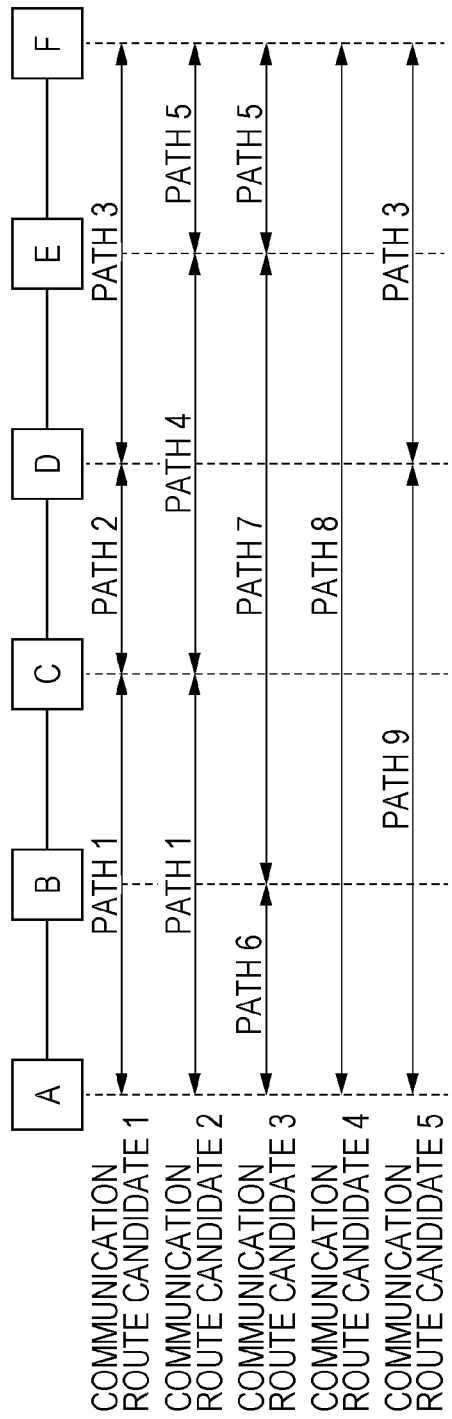
FIG. 11 is a diagram illustrating an example of communication route candidates constituted by paths, according to an embodiment.

In step St13, with respect to each demand, the first processing unit 100 selects one or more paths to thereby extract communication route candidates for the demand. FIG. 11 is a diagram illustrating an example of communication route candidates constituted by paths 1 to 9, according to an embodiment.

For example, a communication route candidate 1 includes paths 1, 2, and 3, and a communication route candidate 2 includes paths 1, 4, and 5. Thus, each of the communication route candidates 1 to 5 is extracted as a combination of one or more paths.

When the communication channel design is performed for the second or subsequent time (NO in step St14), the process proceeds to step St17 in which the first processing unit 100 obtains the detour route information 139 from the HDD 13. The detour route information 139 is generated by the third processing unit 102, as described below. In this case, in step St18, the first processing unit 100 adds a detour route indicated by the detour route information 139 to the communication route candidates. On the other hand, when the communication channel design is performed for the first time (YES in step St14), the first processing unit 100 does not use the detour route information 139.

Next, in step St15, the first processing unit 100 determines a communication route for each demand by solving an integer programming problem and estimates, for each path, the bandwidths and the number of communication channels. An integer programming problem model constructed by the first processing unit 100 is described later.

Figure 12:
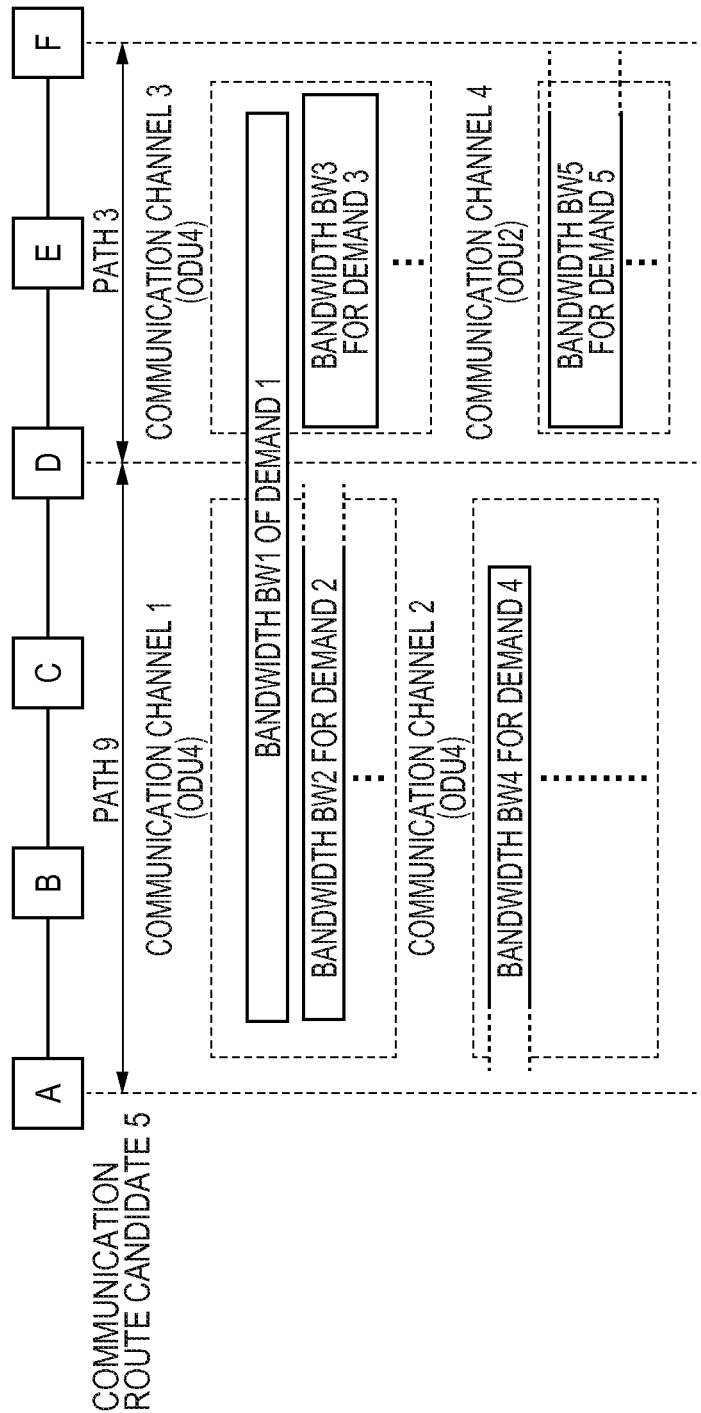
FIG. 12 is a diagram illustrating an example of communication channels established in paths that constitute communication routes, according to an embodiment.

FIG. 12 is a diagram illustrating an example of communication channels established in paths that constitute communication routes, according to an embodiment. In this example, the first processing unit 100 selects, from among the communication route candidates 1 to 5 illustrated in FIG. 11, the candidate 5 as a communication route corresponding to a demand. The selected communication route 5 includes paths 9 and 3.

The first processing unit 100 estimates the number of communication channels established in each of paths 9 and 3. This estimation is performed for each of the bandwidth types (ODU2 and ODU4) of the communication channels. Such communication channel estimation for each bandwidth type makes it possible to perform flexible design in accordance with demands for various bandwidths.

The first processing unit 100 estimates the communication channels in such a manner that the total cost of the communication channels in the network is minimized. The cost of the communication channels is determined, for example, based on the cost of the optical transceivers 70 and so on associated with the communication channels and the maintenance cost thereof.

As a result of the estimation, path 9 is assigned ODU4 communication channels 1 and 2. The communication channel 1 accommodates a bandwidth BW1 for demand 1, a bandwidth BW2 for demand 2, and so on, and the communication channel 2 accommodates a bandwidth BW4 for demand 4 and so on. Path 3 is assigned an ODU4 communication channel 3 and an ODU2 communication channel 4. The communication channel 3 accommodates the bandwidth BW1 for demand 1, a bandwidth BW3 for demand 3, and so on, and the communication channel 4 accommodates a bandwidth BW5 for demand 5 and so on. Unlike this example, the first processing unit 100 may determine, as a communication route, the detour route added to the communication route candidates in the process in step St18.

In step St16, the first processing unit 100 generates the route information 133 and the channel information 134 in accordance with a result of the estimation. The route information 133 indicates a communication route corresponding to each demand as a collection of one or more paths. The channel information 134 indicates the bandwidths and the number of communication channels for each path. The generated route information 133 and channel information 134 are used in the wavelength assignment design performed by the second processing unit 101. The first processing unit 100 performs the processing for the communication channel design, as described above.

Next, a description will be given of the integer programming problem model that the first processing unit 100 generates in the processing in step St15 illustrated in FIG. 9. The integer programming problem is to determine a solution having a predetermined function value as its maximum or minimum in accordance with one or more constraint conditions. The integer programming problem model is constructed based on the topology information 130, the path information 131, the demand information 132, and the wavelength constraint information 135.

The first processing unit 100 uses, for example, equation (1) below as a target function. FIG. 13 illustrates variables used for the integer programming problem model constructed by the first processing unit 100.

$$\text{Minimize} \sum_{h,b} \text{Cost}(b) \cdot x(h, b) \quad (1)$$

According to equation (1), the first processing unit 100 estimates the bandwidths and the number of communication channels in such a manner that the total cost of the communication channels in the network is minimized. The total cost of the communication channels is calculated as a sum of products of the cost of the communication channels and the number of uses for each bandwidth type. The cost of the communication channels is determined based on the cost of the optical transceivers 70, as described above.

The first processing unit 100 uses, for example, equations (2) to (4) as constraint conditions.

$$\sum_t T(\text{Demand}, t) \cdot d(t) = \text{TotalDemandNum (for } \forall \text{ Demand)} \quad (2)$$

$$\sum_t \text{Demand\_Cap}(t) \cdot I(h, t) \cdot d(t) - \sum_b BW(b) \cdot x(h, b) \le 0 \text{ (for } \forall h) \quad (3)$$

$$\sum_h \sum_b \text{Link}(s, h) \cdot x(x, b) \le \text{WavelengthLimit}(s) \text{ (for } \forall s) \quad (4)$$

Equation (2) indicates a constraint condition that the total number of communication routes selected according to each demand be equal to the total number of demands. Equation (3) indicates, for each path, a constraint condition that the total sum of bandwidths of communication routes including the each path be smaller than or equal to the sum of products of the bandwidth and the number of uses for each bandwidth type of communication channel.

Equation (4) indicates, for each link in the network, a constraint condition, that is, the wavelength constraint condition, that the total number of uses of a path including the link be smaller than or equal to the upper limit for the number of wavelengths in the link. The upper limit for the number of wavelengths is based on the wavelength constraint information 135, as described above.

When the third processing unit 102 has performed the feedback processing, the wavelength constraint information 135 serves as the target number of wavelengths for reducing the required number of transmission systems with respect to a link having a possibility of reducing the required number of transmission systems. In this case, with respect to a link having a risk of increasing the required number of transmission systems, the wavelength constraint information 135 also serves as the maximum number of wavelengths allowed in order to inhibit an increase in the required number of transmission systems.

In such a manner, the wavelength constraint condition is changed in the feedback processing performed by the third processing unit 102. Thus, the first processing unit 100 is able to estimate an optimum number of communication channels which reflects the previous design result.

Also, when the third processing unit 102 has performed the feedback processing, the first processing unit 100 adds a detour route to the communication route candidates in step St18 in FIG. 9. In this case, the first processing unit 100 uses equation (5) below as a constraint condition, in addition to equations (1) to (4) described above.

$$d(t_{present}) + \sum_{t\_reroute} d(t) = 1 \text{ (for } \forall \text{ Demand)} \quad (5)$$

Equation (5) indicates a constraint condition that, for each demand, the number of communication routes, which is to be determined based on the communication route determined in the previous design and the detour route added according to the feedback processing performed by the third processing unit 102, be "1". In this case, the first term of equation (5) represents a communication route ($t_{present}$) determined in the previous design, and the second term represents a set of added detour routes (t_reroute). The set of detour routes is obtained for each link from the detour route information 139, as described above.

As described above, by solving a solution that satisfies equation (1) in accordance with the constraint conditions in equations (2) to (4) or equations (2) to (5), the first processing unit 100 determines a communication route corresponding to each demand so that the cost of communication channels is minimized, and estimates the bandwidths and the number of communication channels to be established for each path. This allows the time taken for the communication channel design processing to be effectively reduced. Although the integer programming has been described above as the analysis scheme in the embodiment, the analysis scheme is not limited thereto, and another scheme, such as a heuristic method, may also be used.

Referring back to FIG. 8, after the communication channel design (step St1) is performed, the process proceeds to step St2 in which the second processing unit 101 performs wavelength assignment design for assigning the wavelengths of optical signals to the respective communication channels.

(Wavelength Assignment Design)

Details of the wavelength assignment design will be described next. FIG. 14 is a diagram illustrating an example of communication channels provided in a network, according to an embodiment. This network has a configuration in which nodes (A) to (J) are connected in series in that order.

This network has communication channels D1 to D9. Each of the communication channels D1 to D9 passes through the nodes and links in a range indicated by arrows at opposite ends. For example, the communication channel D1 passes through the nodes (A) to (D) and the links between the nodes (A) to (D). The communication channel D2 passes through the nodes (E) to (G) and the links between the nodes (E) to (G).

FIG. 15 is a diagram illustrating an example of wavelengths assigned to the communication channels D1 to D9 illustrated in FIG. 14. In this case, it is assumed that the total number of wavelengths, which are able to be multiplexed into a multiplexed optical signal by each WDM apparatus 9, is 4, and each transmission system may use wavelengths $\lambda 1$ to $\lambda 4$. Frames denoted by dotted lines represent wavelengths $\lambda 1$ to $\lambda 4$ used in the transmission systems (1) and (2). For example, the wavelength $\lambda 2$ in the transmission system (1) has been assigned to the communication channel D1.

In this example, for the communication channels D2 and D9, the same wavelength $\lambda 1$ is redundantly assigned to the link between the nodes (E) and (F). For the communication channels D3 and D8, the same wavelength $\lambda 2$ is redundantly assigned to the links between the nodes (E) to (H). Thus, according to the wavelength assignment in this example, in the transmission section between the nodes (E) to (H), two transmission systems (1) and (2) are required to be provided.

Figure 16:
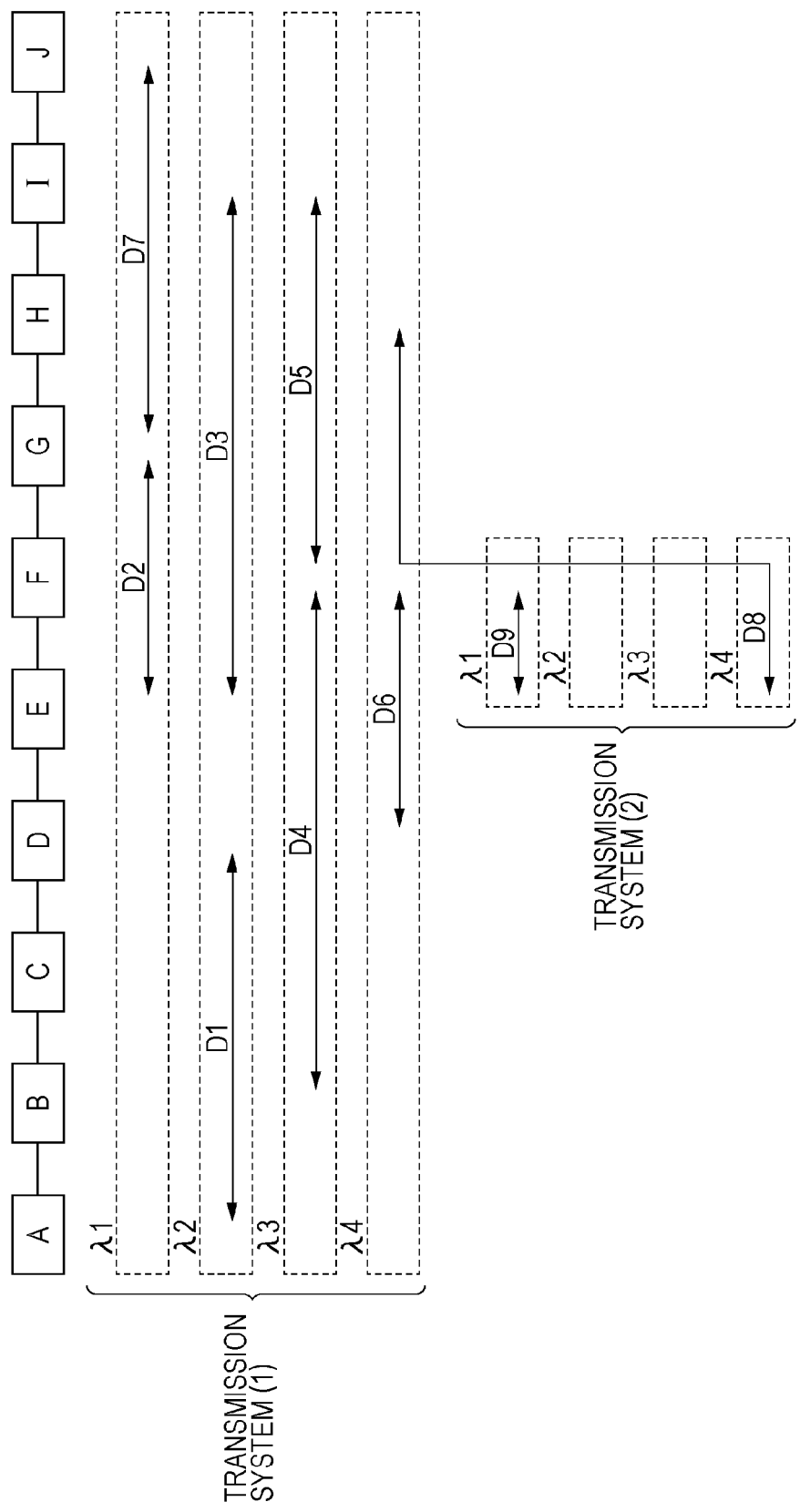
FIG. 16 is a diagram illustrating an example of wavelengths assigned to communication channels illustrated in FIG. 14, according to an embodiment.

FIG. 16 is a diagram illustrating another example of wavelengths assigned to the communication channels D1 to D9 illustrated in FIG. 14. In this example, the wavelength $\lambda 1$ in the transmission system (1) is assigned to the communication channel D7, unlike the case in FIG. 15. For the communication channel D8, the wavelength $\lambda 4$ in the transmission system (2) is assigned between the nodes (E) and (F), and the wavelength $\lambda 4$ in the transmission system (1) is assigned between the nodes (F) and (H). That is, the transmission system for an optical signal in the communication channel D8 is switched at the WDM apparatus 9 at the node (F).

According to the wavelength assignment in this example, since two transmission systems (1) and (2) are provided between only the nodes (E) and (F), equipment cost is reduced compared with that in the example in FIG. 15. Using a scheme such as integer programming, the network design apparatus 1 constructs an appropriate model of a network and derives an optimum solution (wavelengths to be assigned to the respective paths), thereby achieving efficient wavelength assignment as illustrated in FIG. 16.

Figure 17:
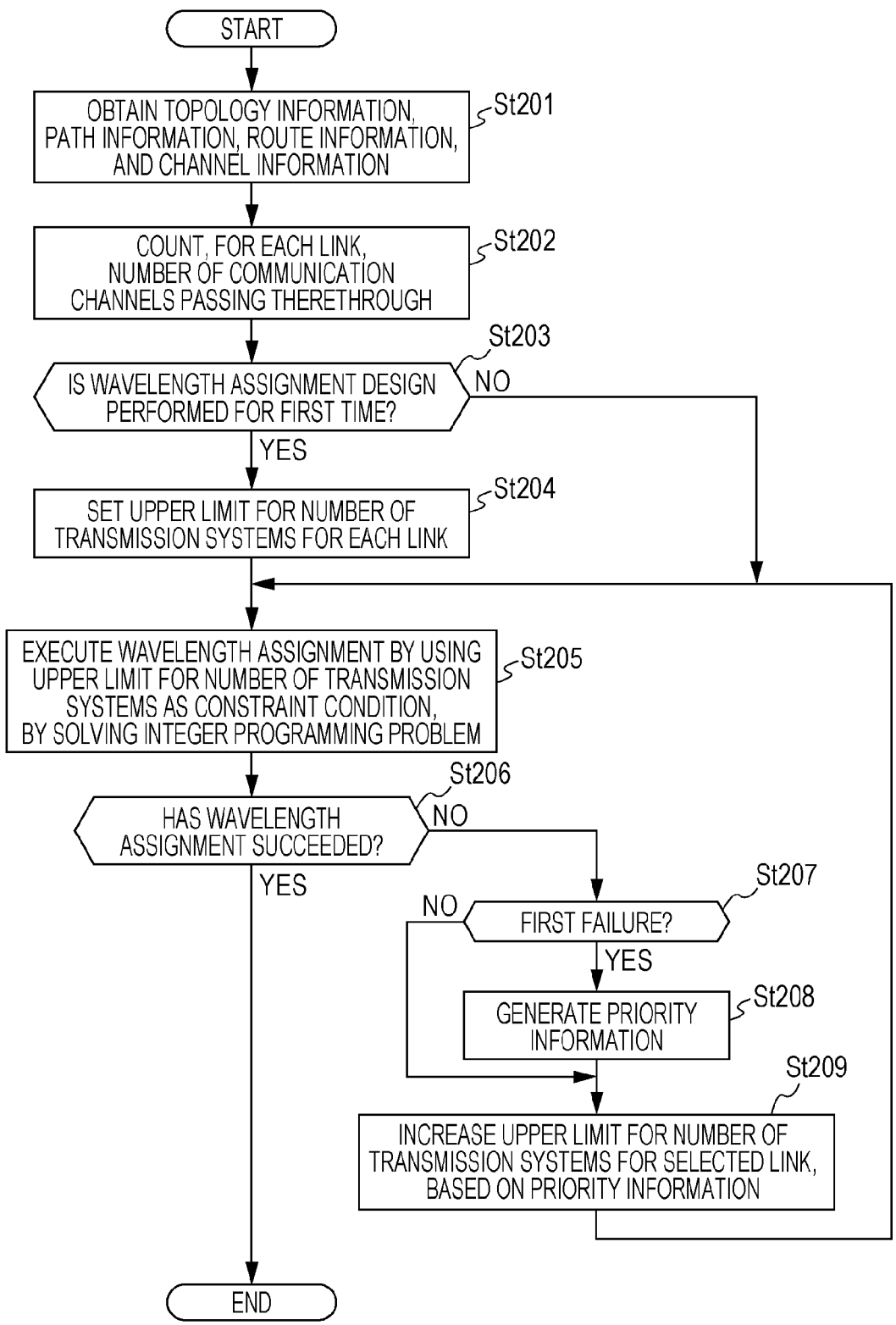
FIG. 17 is a diagram illustrating an example of an operational flowchart for wavelength assignment design, according to an embodiment.

FIG. 17 is a diagram illustrating an example of an operational flowchart for wavelength assignment design, according to an embodiment. First, in step St201, the second processing unit 101 obtains the topology information 130, the path information 131, the route information 133, and the channel information 134 from the HDD 13.

Next, in step St202, based on the topology information 130, the path information 131, the route information 133, and the channel information 134, the second processing unit 101 counts, for each link in the network, the number of communication channels including that link in a route. In the example illustrated in FIG. 14, the second processing unit 101 counts the number of communication channels in the link between the nodes (A) and (B) as "1", the number of communication channels in the link between the nodes (B) and (C) as "2", and the number of communication channels in the link between the nodes (E) and (F) as "6". In the counting processing, the degree of congestion (the degree of concentration) of paths is determined for each link in the network.

When the wavelength assignment design is performed for the first time (YES in step St203), the process proceeds to step St204 in which the second processing unit 101 sets an upper limit for the number of transmission systems for each link, based on the counted number of communication channels. The second processing unit 101 may determine the upper limit for the number of transmission systems, based on a value obtained by dividing the number of communication channels for each link by the total number of wavelengths that are able to be multiplexed into a multiplexed optical signal. In such a case, the upper limit for the number of transmission systems is determined as an integer by rounding up a value after the decimal point of the quotient of the division.

In the example illustrated in FIG. 14, the total number of wavelengths that are able to be multiplexed into a multiplexed optical signal by each WDM apparatus 9 is 4. Thus, for example, with respect to the link between the node (A) and (B), the upper limit for the number of transmission systems is "1", which is obtained by calculating 1/4. Also, with respect to the link between the nodes (B) and (C), the upper limit for the number of transmission systems is 1, which is obtained by calculating 2/4, and with respect to the link between the nodes (E) and (F), the upper limit for the number of transmission systems is 2, which is obtained by calculating 6/4.

As described above, through setting the upper limit for the number of transmission systems, the wavelength assignment design is performed so as to reduce the required number of transmission systems. The second processing unit 101 writes the upper limit for the number of transmission systems, together with the number of communication channels, to the HDD 13 as the system constraint information 136.

On the other hand, when the wavelength assignment design is performed for the second or subsequent time (NO in step St203), the second processing unit 101 uses the upper limit for the number of transmission systems that is set according to feedback processing performed by the third processing unit 102.

In step St205, the second processing unit 101 assigns, for each link, the wavelengths of optical signals multiplexed in a multiplexed optical signal to the respective communication channels, in accordance with the system constraint condition that the number of optical signals having the same wavelength that is able to be redundantly used be smaller than or equal to the upper limit for the number of transmission systems. The system constraint condition is obtained through reading of the system constraint information 136 from the HDD 13. The second processing unit 101 also performs wavelength assignment by constructing an integer programming model and determining an optimum solution. This integer programming model is described later.

In step St206, the second processing unit 101 determines whether the wavelength assignment has succeeded. When the wavelength assignment has succeeded (YES in step St206), the second processing unit 101 ends the processing. On the other hand, when the wavelength assignment has failed (NO in step St206), the process proceeds to step St207 in which the second processing unit 101 determines whether this failure is a first failure after the wavelength assignment processing being executed was started.

When the failure is a first failure (YES in step St207), the second processing unit 101 generates priority information 137 in step St208. The generation scheme for generating the priority information 137 will be described below with reference to FIG. 18.

The second processing unit 101 selects, as a congested link, a link through which a predetermined number of communication channels or more pass in the network and selects other links as uncongested links. For example, when a link through which five or more paths pass through is assumed to be a congested link in the example illustrated in FIG. 14, the link between the nodes (E) and (F) corresponds to the congested link (see "congested link" in FIG. 18), and the other links correspond to the uncongested links (see "uncongested link").

The second processing unit 101 calculates a ratio of the number of communication channels that pass through a link to the total number of wavelengths that are able to be multiplexed into a multiplexed optical signal (this ratio is hereinafter referred to as a "usage rate") and selects, as a high-usage-rate link, a link for which the ratio is higher than or equal to a threshold. A high-usage-rate link is selected from uncongested links. For example, when the threshold is assumed to be 70%, the link between the nodes (F) and (G) corresponds to the high-usage-rate link, since the number of communication channels therefor is 4, and the usage rate for the total number of wavelengths (4 wavelengths) that are able to be multiplexed is 100%. That is, in this example, a link in which the number of communication channels is 3 or more corresponds to the high-usage-rate link (see "high-usage-rate link" in FIG. 18).

For each of the uncongested links, the second processing unit 101 also calculates, as a congestion-related index value, the number of communication channels that are included in communication channels passing through the uncongested link and that pass through a congested link. This congestion-related index value indicates, for each uncongested link, the number of communication channels related to a congested link. For example, in the case of the link between the nodes (F) and (G), since three communication channels, namely, the communication channels D2, D3, and D8 passing through a congested link (the link between the nodes (E) and (F), pass through the link between the nodes (F) and (G), the congestion-related index value is 3. In the case of the link between the nodes (D) and (E), since two communication channels, namely, the communication channel D4 and D6 passing through a congested link pass through the link the nodes (D) and (E), the congestion-related index value is 2 (see "congestion-related index value" in FIG. 8).

The second processing unit 101 generates, for each link, priority information 137, based on the above-described usage rate (that is, whether or not the link corresponds to the high-usage-rate link) and the congestion-related index value. In this example, the second processing unit 101 gives a higher priority to a link corresponding to the high-usage-rate link than to other links. In addition, the second processing unit 101 gives a higher priority to a link whose congestion-related index value is higher. That is, to determine the priority, the second processing unit 101 determines, with high priority, the condition as to whether or not a link in question corresponds to the high-usage-rate link, and determines a congestion-related index value in the following stage.

The priority information 137 generated according to this scheme is illustrated as "priority" in FIG. 18. A priority of "1" is the highest, and a priority of "8" is the lowest. When the congestion-related index values of links that correspond to the high-usage-rate links or links that do not correspond to the high-usage-rate links are the same, the priority of either of the links may be increased.

Referring back to FIG. 17, when the failure is not a first failure (NO in step St207), the second processing unit 101 does not generate the priority information 137 since it uses the already-generated priority information 137. In step St209, the second processing unit 101 increases the upper limit for the number of transmission systems for the selected link, based on the priority information 137. That is, the selection of a link for which the upper-limit value is to be increased is performed according to the above-described priorities.

In the case of the example in FIG. 18, when the wavelength assignment fails for the first time, the link between the nodes (F) and (G) for which the priority is "1" is selected, and when the wavelength assignment fails for the second time, the link between the nodes (G) and (H) for which the priority is "2" is selected. Thus, for the uncongested links, the constraint condition (system constraint condition) for the number of transmission systems is relaxed in descending order of the degrees of association with a congested link.

After St209, the second processing unit 101 executes the process in step St205 again. That is, when the wavelength assignment is not possible because of the system constraint condition, the second processing unit 101 attempts the wavelength assignment by relaxing the system constraint condition, until the wavelength assignment succeeds. According to this method, since the system constraint condition for each link is relaxed according to the order of priorities, it is possible to efficiently perform wavelength assignment without wastefully increasing the number of transmission systems. The wavelength assignment design is performed as described.

Next, a description will be given of the integer programming problem model that the second processing unit 101 constructs in the process in St205 illustrated in FIG. 17. The second processing unit 101 uses, for example, equation (6) noted below as a target function. FIG. 19 illustrates variables used for the integer programming problem model constructed by the second processing unit 101.

$$\text{Minimize} \sum_{l,h} LambdaNo(w) \times x(w, k) \qquad (6)$$

According to equation (6), the second processing unit 101 assigns wavelengths so that the total sum of label numbers of wavelengths used for the respective communication channels is minimized. The label numbers in this case are information corresponding to names given to the respective wavelengths. The second processing unit 101 selects wavelengths to be assigned, with higher priority given to smaller label numbers.

The second processing unit 101 uses, for example, equations (7) and (8) as constraint conditions.

$$\sum_w x(w, k) = 1 \text{ (for } \forall k) \quad (7)$$

$$\sum_k \text{Link}(k, s) \times x(w, k) \leq \text{SystemNum}(s) \text{ (for } \forall w, s) \quad (8)$$

Equation (7) represents, for the second processing unit 101, a constraint condition that a single wavelength be assigned to each communication channel. This constraint condition is based on a technical constraint that switching of the wavelength of an optical signal to another wavelength be prohibited in the middle of a path for one communication channel.

Equation (8) represents, for the second processing unit 101, a constraint condition (a system constraint condition) that the number of same wavelengths that are able to be redundantly used in a single link be smaller than or equal to the upper limit for the number of transmission systems. This constraint condition is based on the technical constraints that, since multiple wavelengths that are able to be multiplexed into one multiplexed optical signal are different from each other, one transmission system is capable of transmitting only one set of the multiple wavelengths. For example, in the case of the example in FIG. 14, since the upper limit for the number of transmission systems in the link between the nodes (E) and (F) is 2 (see FIG. 18), each wavelength may be used for up to two communication channels, and since the upper limit for the number of transmission systems in other links is 1, each wavelength may be used for only one communication channel.

The upper limit for the number of transmission systems is based on the system constraint information 136, as described above. When the third processing unit 102 has performed the feedback processing, the upper limit for the number of transmission systems is given as "the number of transmission systems in the previous design processing"-1, with respect to a link for which there is a possibility of reducing the required number of transmission systems. In this case, with respect to a link for which there is a risk of increasing the required number of transmission systems, the upper limit for the number of transmission systems is maintained at a value obtained at the time of the previous design processing.

As described above, the system constraint condition is changed in the feedback processing performed by the third processing unit 102. Thus, the second processing unit 101 may perform optimum wavelength assignment design reflecting the previous design result.

(Determination of Target Number of Wavelengths)

Figure 20:
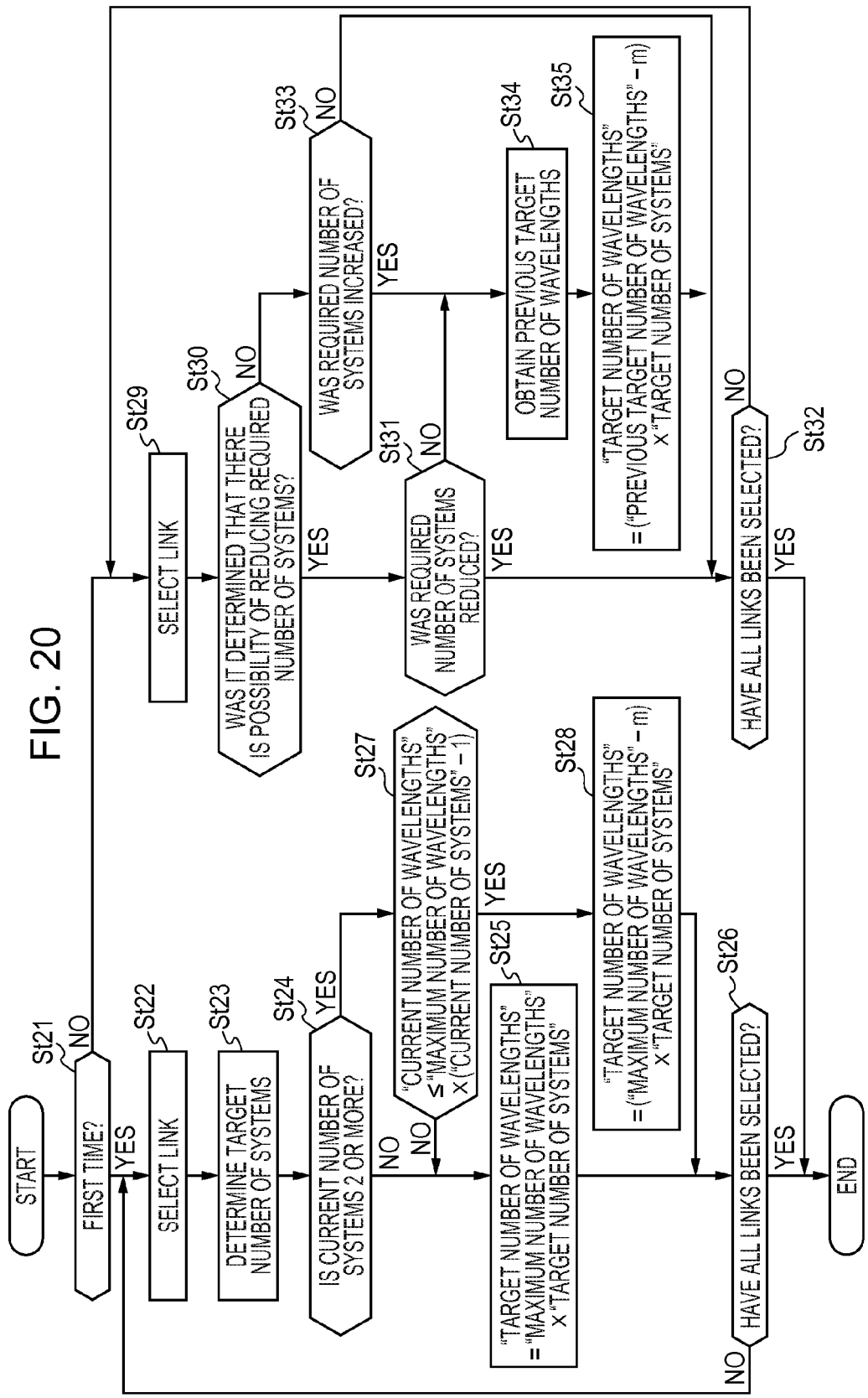
FIG. 20 is a diagram illustrating an example of an operational flowchart for determining a target number of wavelengths, according to an embodiment.

Referring back to FIG. 8, after completion of the communication channel design and the wavelength assignment design, in step St3, the third processing unit 102 determines, for each link, a target number of wavelengths for reducing the number of transmission systems. FIG. 20 is a diagram illustrating an example of an operational flowchart for determining a target number of wavelengths, according to an embodiment.

When the feedback processing is performed for the first time (YES in step St21), the third processing unit 102 selects a link in step St22 and determines a target number of systems for the selected link in step St23. The target number of systems is a target number to which the required number of transmission systems is to be reduced, and is determined based on, for example, the number of wavelengths (hereinafter referred to as the "current number of wavelengths") and the number of transmission systems (hereinafter referred to as the "current number of systems") determined in the previous design processing. The current number of wavelengths is obtained from the wavelength constraint information 135, and the current number of systems is obtained from the system constraint information 136.

When the current number of systems is 2 or more (YES in step St24), the process proceeds to step St27 in which the third processing unit 102 determines whether or not the current number of wavelengths is smaller than or equal to a product of "the maximum number of wavelengths that are able to be transmitted by one transmission system" and ("the current number of systems"-1). when the current number of wavelengths is smaller than or equal to the product of "the maximum number of wavelengths that are able to be transmitted by one transmission system" and ("the current number of systems"-1) (YES in step St27), the process proceeds to step St28 in which the target number of wavelengths is calculated according to equation (9) noted below. In equation (9), m denotes a wavelength adjustment number and is set at an arbitrarily value (for example, "1").

The target number of wavelengths=("the maximum number of wavelengths"−m)×the target number of systems(9)

On the other hand, when the current number of systems is one (NO in step St24) or when the current number of wavelengths is larger than the product of the maximum number of wavelengths in one transmission system and (the current number of systems-1) (NO in step St27), the process proceeds to step St25 in which the target number of wavelengths is calculated according to equation (10) noted below. The calculated target number of wavelengths is written to the HDD 13 as the wavelength constraint information 135.

The target number of wavelengths=the maximum number of wavelengths×the target number of systems(10)

When all of the links have been selected (YES in step St26), the third processing unit 102 ends the processing. Otherwise (NO in step St26), the third processing unit 102 selects another link in step St22 and then performs the process in step St23 again.

When the feedback processing is performed for the second or subsequent time (NO in step St21), the third processing unit 102 selects a link in step St29. In step St30, the third processing unit 102 checks whether or not, in the previous feedback processing, it was determined in the processing (see FIG. 22) for determining a possibility of reducing the required number of transmission systems that the selected link has a possibility of reducing the required number of transmission systems. In this case, the third processing unit 102 performs the checking, based on the reduction determination information 141.

Upon confirming that it was determined that the selected link has a possibility of reducing the required number of transmission systems (YES in step St30), the process proceeds to step St31 in which the third processing unit 102 checks whether or not the required number of transmission systems was reduced in the immediately preceding wavelength assignment design. In this case, the third processing unit 102 performs the checking, based on the system constraint information 136.

When the required number of transmission systems was reduced (YES in step St31) and when all of the links have been selected (YES in step St32), the third processing unit 102 ends the processing. Otherwise (NO in step St32), the third processing unit 102 selects another link in step St29 and then performs the process in step St30 again.

Also, upon confirming that it was determined that the selected link has no possibility of reducing the required number of transmission systems (NO in step St30), the process proceeds to step St33 in which the third processing unit 102 checks whether or not the required number of transmission systems was increased in the immediately preceding wavelength assignment design. In this case, the third processing unit 102 performs the checking, based on the system constraint information 136.

When the number of transmission systems was increased (YES in step St33) or the number of transmission systems was not reduced (NO in step St31), the process proceeds to step St34 in which the third processing unit 102 obtains the target number of wavelengths (the latest target number of wavelengths) in the previous feedback processing. In this case, the third processing unit 102 reads the wavelength constraint information 135 from the HDD 13.

In step St35, the third processing unit 102 calculates the target number of wavelengths in accordance with equation (11) noted below. The calculated target number of wavelengths is written to the HDD 13 as the wavelength constraint information 135. The "previous target number of wavelengths" in this case is the value obtained in step St34.

The target number of wavelengths=("the previous target number of wavelengths"−m)×the target number of systems (11)

As described above, the third processing unit 102 adjusts, for each link, the target number of wavelengths in accordance with an increase or reduction in the required number of transmission systems in the wavelength assignment processing performed by the second processing unit 101 for the second or subsequent time. Thus, each time the number of times the design processing is performed increases, the possibility of reducing the required number of transmission systems is increased.

Next, the third processing unit 102 performs the process in step St32 described above. When the required number of transmission systems was not increased (NO in step St33), the process in step St32 is performed. The determination processing for determining the target number of wavelengths is performed in the manner described above.

FIG. 21 is a diagram illustrating an example of calculating a target number of wavelengths, according to an embodiment. In this example, it is assumed that the wavelength adjustment number m is 1 and the maximum number of wavelengths is 4. This example is an example of calculating a target number of wavelengths when the feedback processing is performed for the first time.

For example, when the current number of wavelengths is 4, the current number of systems is 1, and the target number of systems is 1, then the target number of wavelengths is 4, based on equation (10). When the current number of wavelengths is 4, the current number of systems is 2, and the target number of systems is 1, then the target number of wavelengths is 3, based on equation (9). When the current number of wavelengths is 5, the current number of systems is 2, and the target number of systems is 1, then the target number of wavelengths is 4, based on equation (10). When the current number of wavelengths is 6, the current number of systems is 2, and the target number of systems is 1, then the target number of wavelengths is 4, based on equation (10)

When the current number of wavelengths is 8, the current number of systems is 2, and the target number of systems is 2, then the target number of wavelengths is 8, based on equation (10). when the current number of wavelengths is 8, the current number of systems is 3, and the target number of systems is 2, then the target number of wavelengths is 8, based on equation (9). When the current number of wavelengths is 9, the current number of systems is 3, and the target number of systems is 2, then the target number of wavelengths is 8, based on equation (10). As described above, the target number of wavelengths is determined so that the target number of systems is reached, based on the current number of wavelengths and the current number of systems.

(Determination of Possibility of Reducing Transmission Systems)

Figure 22:
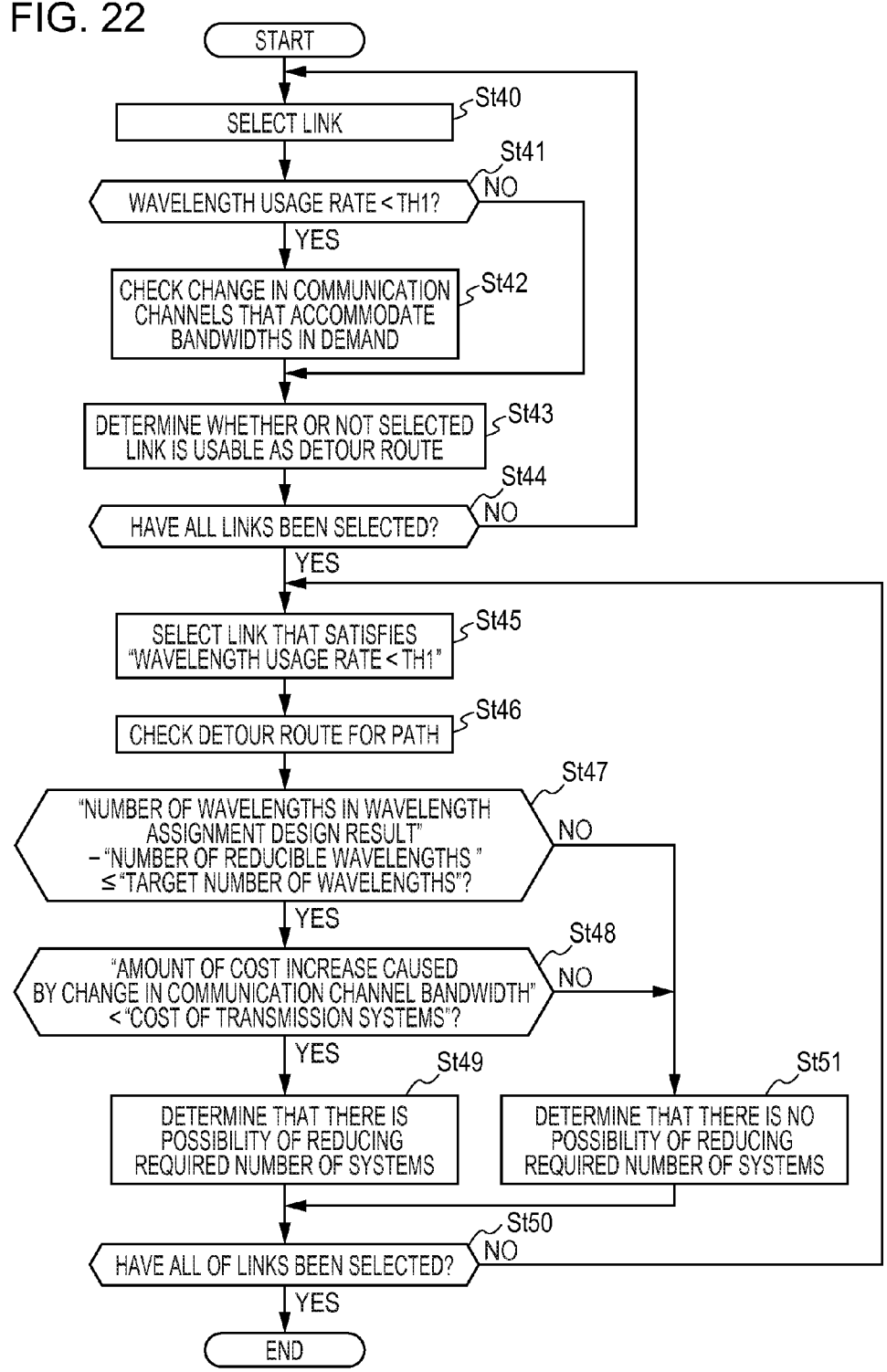
FIG. 22 is a diagram illustrating an example of an operational flowchart for determining a possibility of reducing the number of transmission systems, according to an embodiment.

Referring back to FIG. 8, in step St4, the third processing unit 102 determines whether or not there is a possibility of reducing the required number of transmission systems. FIG. 22 is a diagram illustrating an example of an operational flowchart for determining a possibility of reducing the required number of transmission systems, according to an embodiment.

The third processing unit 102 selects a link in step St40. In step St41, the third processing unit 102 determines whether or not a wavelength usage rate for the selected link is smaller than a predetermined threshold TH1. The wavelength usage rate is the ratio of the number of wavelengths used in the link (the number of optical signals transmitted in the link) to the maximum number of wavelengths that are able to be multiplexed into a multiplexed optical signal.

For example, when the maximum number of wavelengths is 40 and the number of wavelengths used is 12, the wavelength usage rate is 30% (=12/40×100). When a plurality of transmission systems are used in the link, a smallest ratio among ratios calculated for the plurality of transmission systems is used as the wavelength usage rate. The threshold TH1 is set at an arbitrary value.

When the wavelength usage rate for the link is smaller than the predetermined threshold TH1 (YES in step St41), the process proceeds to step St42 in which the third processing unit 102 checks a change in the communication channels that accommodate the bandwidth for a demand. In this processing, the number of wavelengths that are able to be reduced by a change in the bandwidths of the communication channels, that is, the first reduced number of wavelengths described above, is calculated. On the other hand, when the wavelength usage rate for the link is larger than or equal to the predetermined threshold TH1 (NO in step St41), the third processing unit 102 does not perform the process in step St42.

Figure 23:
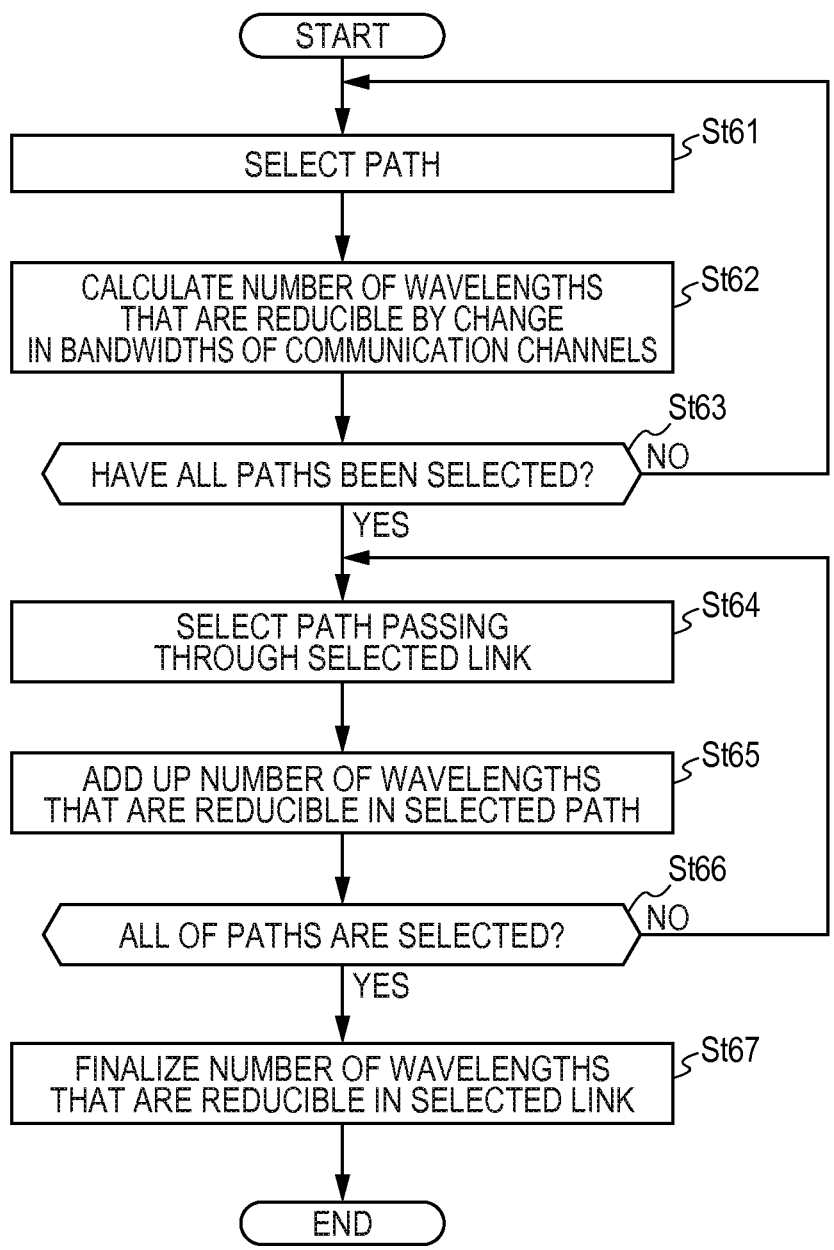
FIG. 23 is a diagram illustrating an example of an operational flowchart for calculating the number of wavelengths that are reducible by a change in the bandwidths of communication channels, according to an embodiment.

FIG. 23 is a diagram illustrating an example of an operational flowchart for calculating the number of wavelengths that are able to be reduced by a change in the bandwidths of communication channels, according to an embodiment. First, in step St61, the third processing unit 102 selects a path. In step St62, the third processing unit 102 calculates, for the selected path, the number of wavelengths that ate able to be reduced by a change in the bandwidths of the communication channels (this number of wavelengths is hereinafter referred to as a "first reduced number of wavelengths"). More specifically, the third processing unit 102 changes a narrowband (for example, ODU2) communication channel to a broadband (for example, ODU4) communication channel, and calculates a number of communication channels that are able to be reduced, by accommodating a larger number of bandwidths in demands into the broadband communication channel.

When all paths have not yet been selected (NO in step St63), the third processing unit 102 selects another path in step St61 and performs the process in step St62 again. When all paths have been selected (YES in step St63), the process proceeds to step St64 in which the third processing unit 102 selects a path passing through the selected link (see step St40 in FIG. 22). In step St65, the third processing unit 102 adds up the number of wavelengths that are able to be reduced in the selected path. That is, until all of the paths have been selected (YES in step St66), the third processing unit 102 performs the processes in steps St64 and St65 to calculate a total number of wavelengths that are able to be reduced.

Next, in step St67, the third processing unit 102 finalizes the number of wavelengths that are able to be reduced in the selected link, that is, finalizes the first reduced number of wavelengths. The third processing unit 102 writes the finalized first reduced number of wavelengths to the HDD 13 as the reduction determination information 141. The processing for calculating the first reduced number of wavelengths is performed in the manner described above.

Figure 24A:
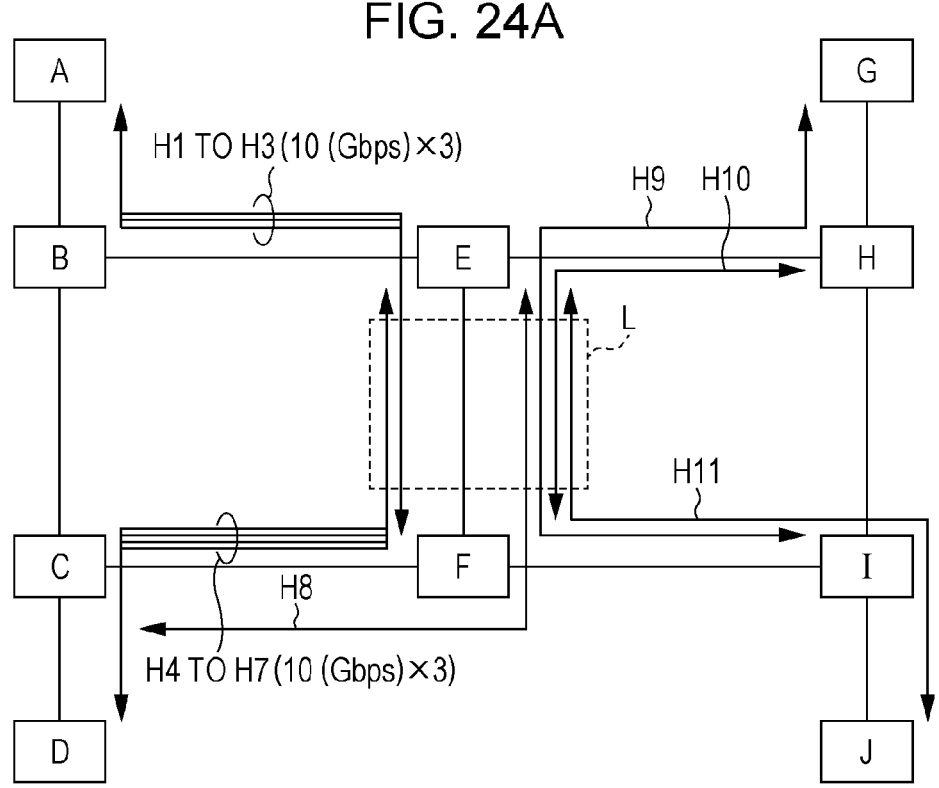
FIGS. 24A and 24B are diagrams illustrating an example of states before a change in the bandwidths of communication channel and after the change, according to an embodiment.
Figure 24B:
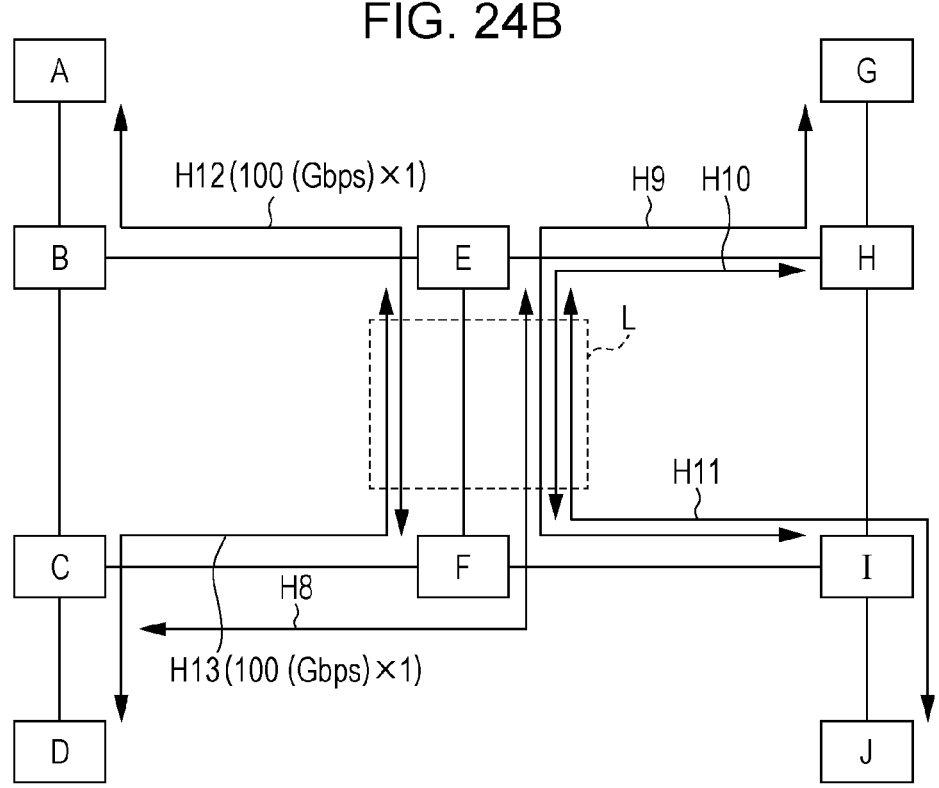

Next, a description will be given of an example of calculating the first reduced number of wavelengths. FIGS. 24A and 24B are diagrams illustrating an example of states before a change in the bandwidths of communication channel and after the change, according to an embodiment. More specifically, FIG. 24A illustrates a state before a change in the bandwidths of communication channels, and FIG. 24B illustrates a state after the change in the bandwidths of the communication channels.

The network has nodes (A) to (J). The nodes (A) to (D) are linearly connected, and the nodes (G) to (J) are also linearly connected. The nodes (B) and (H) are connected to each other via the node (E), and the nodes (C) and (I) are connected to each other via the node (F). It is assumed in this case that a link L that provides a connection between the nodes (E) and (F) is a selected link.

In the state before the change, the network has 11 communication channels H1 to H11. The communication channels H1 to H3 pass through the nodes (A), (B), (E), and (F), and the communication channels H4 to H7 pass through the nodes (D), (C), (F), and (E). The communication channel H8 passes through the nodes (C), (F), and (E), and the communication channel H9 passes through the nodes (G), (H), (E), (F), and (I). The communication channel H10 passes through the nodes (H), (E), (F), and (I), and the communication channel H11 passes through the nodes (E), (F), (I), and (3). Thus, since the number of communication channels H1 to H11 passing through the link L is 11, the number of wavelengths used in the link L is 11.

In this example, the bandwidths of the communication channels H1 to H7 are assumed to be bandwidths to be changed. The bandwidths of the communication channels H1 to H7 are each 10 Gbps (ODU2).

In the state after the change, the communication channels H1 to H3 and the communication channels H4 to H7 are changed to 100 Gbps (ODU4) communication channels H12 and H13, respectively. As a result, since the number of communication channels H8 to H13 passing through the link L is reduced by 5 and becomes 6, the number of wavelengths used in the link L is 6. That is, in this example, the first reduced number of wavelengths in the link L is 5.

Referring back to FIG. 22, in step St43, based on a result (step St42) of the checking of the change in the communication channels, the third processing unit 102 determines whether or not the selected link is able to be used as a detour route. In the example illustrated in FIGS. 24A and 24B, when the maximum number of wavelengths that are able to be transmitted by one transmission system is assumed to be 10, the number of wavelengths used in the link L is 6. As a result, four waveforms (=10−6) are available, and it is thus determined that the link L is able to be used as a detour route.

Unlike this example, with respect to a link for which a plurality of transmission systems are used, when a change in the bandwidths of communication channels, as described above, is not possible, whether or not the link is able to be used as a detour route is determined according to a rule specified as appropriate. For example, for a link in which 11 waveforms are used, when there is a possibility of reducing the number of transmission systems from 2 to 1, it may also be determined that the link is not usable as a detour route. The determination scheme is not limited to this example. A result of the determination as to whether or not each link is able to be used as a detour route is written to the HDD 13 as the detour route information 139.

When all of the links have not yet been selected (NO in step St44), the third processing unit 102 selects another link in step St40 and performs the process in step St41 again. When all of the links have been selected (YES in step St44), the process proceeds to step St45 in which the third processing unit 102 selects a link that satisfies "the wavelength usage rate <TH1" (see step St41). In step St46, the third processing unit 102 checks, for the selected link, a detour route for a path including the selected link in a route. In this processing, the number of wavelengths that are able to be reduced through use of the detour route, that is, the above-described second reduced number of wavelengths, is calculated.

Figure 25:
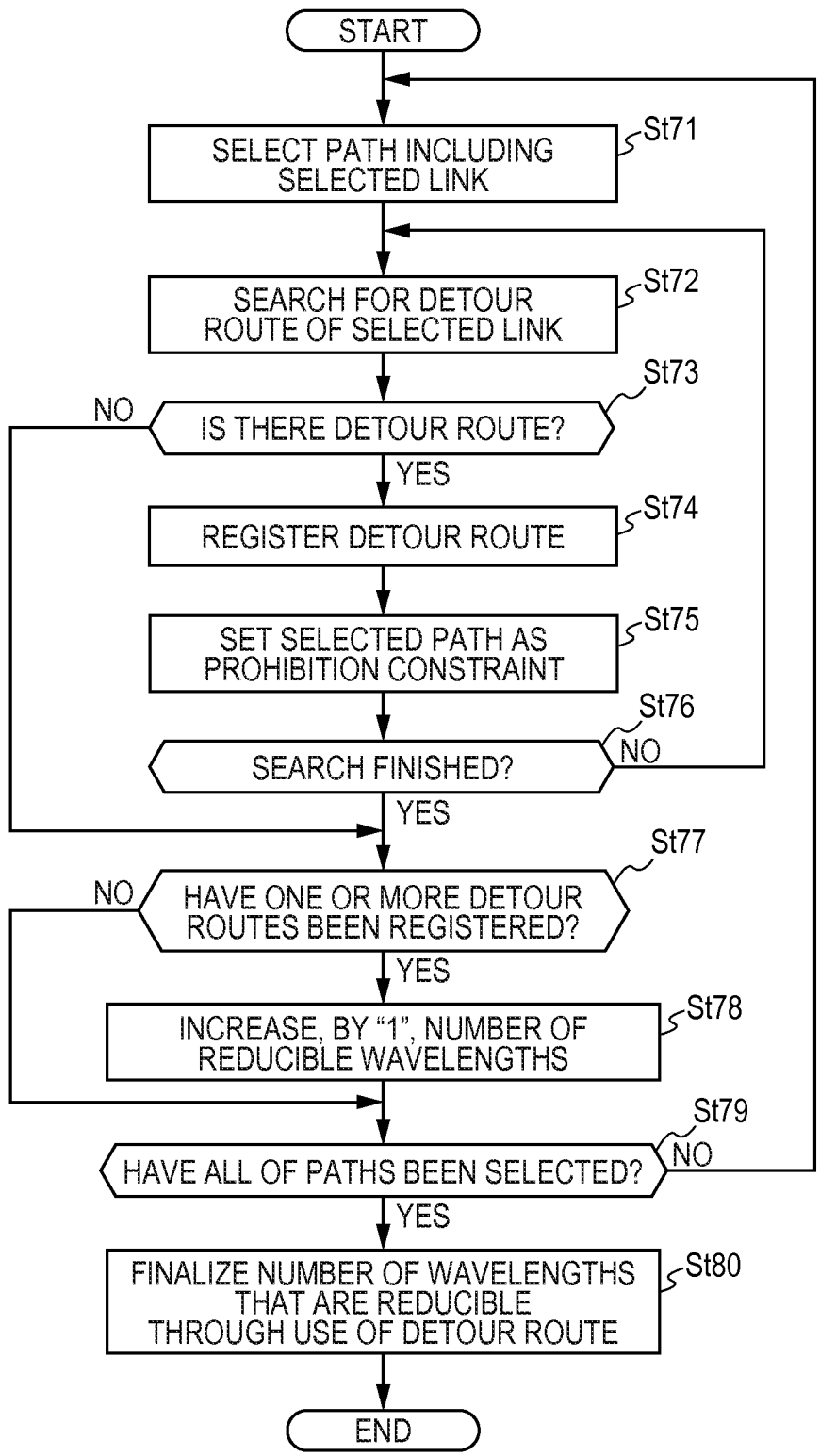
FIG. 25 is a diagram illustrating an example of an operational flowchart for calculating the number of wavelengths that are reducible through use of a detour route, according to an embodiment.

FIG. 25 is a diagram illustrating an example of an operational flowchart for calculating the number of wavelengths that are able to be reduced through use of a detour route, according to an embodiment. In step St71, the third processing unit 102 selects a path including the selected link. In step St72, with respect to the selected path, the third processing unit 102 searches for a detour route that bypasses the selected link. In this case, based on the detour route information 139 read from the HDD 13, the third processing unit 102 searches for a detour route that is formed to pass through only links (see step St43 in FIG. 22) that are able to be used as a detour route. Although a scheme for the searching is, for example, shortest path search, such as Dijkstra's algorithm, the scheme is not limited thereto.

Figure 26:
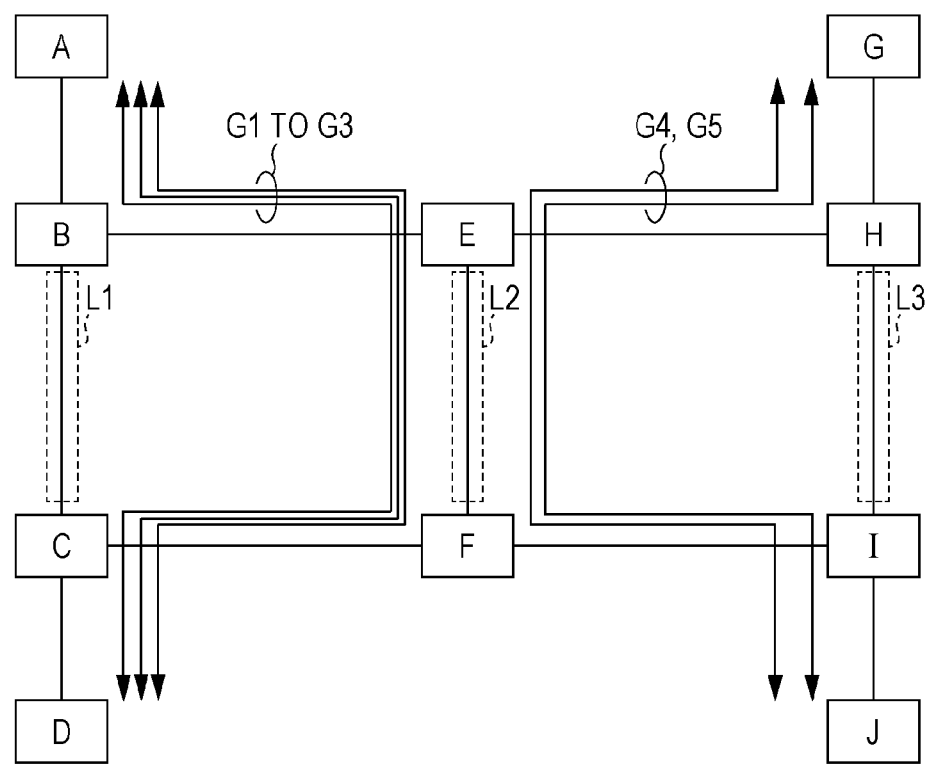
FIG. 26 is a diagram illustrating an example of detour routes, according to an embodiment.

FIG. 26 is a diagram illustrating an example of detour routes, according to an embodiment. The network configuration illustrated in this example is the same as the network configuration illustrated in FIGS. 24A and 24B.

A path for the communication channels G1 to G3 is a detour route that bypasses a link L1 between the nodes (B) and (C) with respect to a path that passes through the nodes (A) to (D). In this case, it is assumed that the link between the nodes (C) and (F), the link between the nodes (F) and (E), and the link between the nodes (E) and (B) are able to be used as a detour route.

A path for the communication channels G4 and G5 is a detour route that bypasses a link L3 between the node (H) and the node (I) with respect to a path that passes through the nodes (G) to (J). In this case, it is assumed that the link between the nodes (I) and (F) and the link between the nodes (E) and (H) are able to be used as a detour route.

Referring back to FIG. 25, when there is a detour route that bypasses the link with respect to the selected path (YES in step St73), the third processing unit 102 registers the detour route in step St74. That is, the found detour route is written to the HDD 13 as the detour route information 139.

Next, in step St75, the third processing unit 102 sets the selected path as a prohibition constraint in the detour route search processing (step St72). As a result, the selected path is excluded from paths to be searched.

Next, when the detour route search has not been finished (NO in step St76), the third processing unit 102 executes the process in step St72 again. When the detour route search has been finished (YES in step St76) and one or more detour routes have been registered (YES in step St77), the number of wavelengths that are able to be reduced is increased by "1" in step St78; otherwise (NO in step St77), the number of wavelengths that are able to be reduced is not increased.

That is, until all of the paths have been selected (YES in step St79), the number of wavelengths that are able to be reduced is added up. In other words, with respect to all paths including the selected link, the total number of wavelengths (that is, the total number of communication channels) that are able to be reduced by changing to the detour route(s) is calculated. When there is no detour route (NO in step St73), the processes in steps St77 to St79 are also performed in the same manner.

When all of the paths have been selected (YES in step St79), the process proceeds to step St80 in which the third processing unit 102 finalizes the number of wavelengths that are able to be reduced through use of the detour route, that is, finalizes the above-described second reduced number of wavelengths. The third processing unit 102 records the finalized second number of wavelengths to the HDD 13 as the reduction determination information 141. The second reduced number of wavelengths is calculated as described above.

Referring back to FIG. 22, in step St47, the third processing unit 102 determines whether or not a value obtained by subtracting the number of wavelengths that are able to be reduced from the number of wavelengths in the wavelength assignment design result is smaller than or equal to the target number of wavelengths. The number of wavelengths in the wavelength assignment design result is obtained from the HDD 13 as the wavelength assignment information 138. The number of wavelengths that are able to be reduced is the total of the first reduced number of wavelengths and the second reduced number of wavelengths (a total number for each link) obtained from the HDD 13 as the reduction determination information 141. The target number of wavelengths is obtained from the HDD 13 as the wavelength constraint information 135.

When the value obtained by subtracting the number of wavelengths that are able to be reduced from the number of wavelengths in the wavelength assignment design result is smaller than or equal to the target number of wavelengths (YES in step St47), the process proceeds to step St48 in which the third processing unit 102 determines whether or not the amount of cost increase caused by the change in the bandwidths of the communication channels is smaller than the cost of the transmission systems. In this case, when the bandwidth of a communication channel is changed from 10 Gbps to 100 Gbps, as in the example in FIGS. 24A and 24B, the amount of cost increase is expected to occur by changing the type of optical transceiver 70 to a broadband optical transceiver 70.

When the amount of cost increase in is smaller than the cost of the transmission systems (YES in step St48), the process proceeds to step St49 in which the third processing unit 102 determines that the selected link has a possibility of reducing the required number of transmission systems. On the other hand, when the amount of cost increase is larger than or equal to the cost of the transmission systems (NO in step St48), the process proceeds to step St51 in which the third processing unit 102 determines that there is no possibility of reducing the required number of transmission systems.

As described above, when the amount of cost increase caused by the change in the bandwidths of the communication channels exceeds the amount of cost reduction caused by a reduction in the number of transmission systems, the third processing unit 102 determines that there is no possibility of reducing the required number of transmission systems. Thus, for each link, it is possible to inhibit a cost increase caused by reducing the number of wavelengths.

When the value obtained by subtracting the number of wavelengths that are able to be reduced from the number of wavelengths in the wavelength assignment design result is larger the target number of wavelengths (NO in step St47), the process also proceeds to step St51 in which the third processing unit 102 determines that the selected link also has no possibility of reducing the required number of transmission systems.

As described above, the third processing unit 102 determines whether or not there is a possibility of reducing the required number of transmission systems, by determining whether or not the target value for the number of wavelengths (the target number of wavelengths) is achieved by at least one of a change in the bandwidths of communication channels and a change in communication routes. In this case, the third processing unit 102 determines whether or not the target value for the number of wavelengths is achieved by changing, among a plurality of communication routes, a communication route passing through the selected link to a detour route that bypasses the link. Thus, as described above, it is easy to determine whether or not the target value for the number of wavelengths is achieved, by using a known shortest path search algorithm, such as a Dijkstra's algorithm.

Next, when all of the links have not yet been selected (NO in step St50), the third processing unit 102 performs the process in step St45 again, and when all of the links have been selected (YES in step St50), the third processing unit 102 ends the processing. The processing for determining a possibility of reducing the required number of transmission systems is performed in the manner described above.

(Determination of Risk of Increasing the Number of Transmission Systems)

Figure 27:
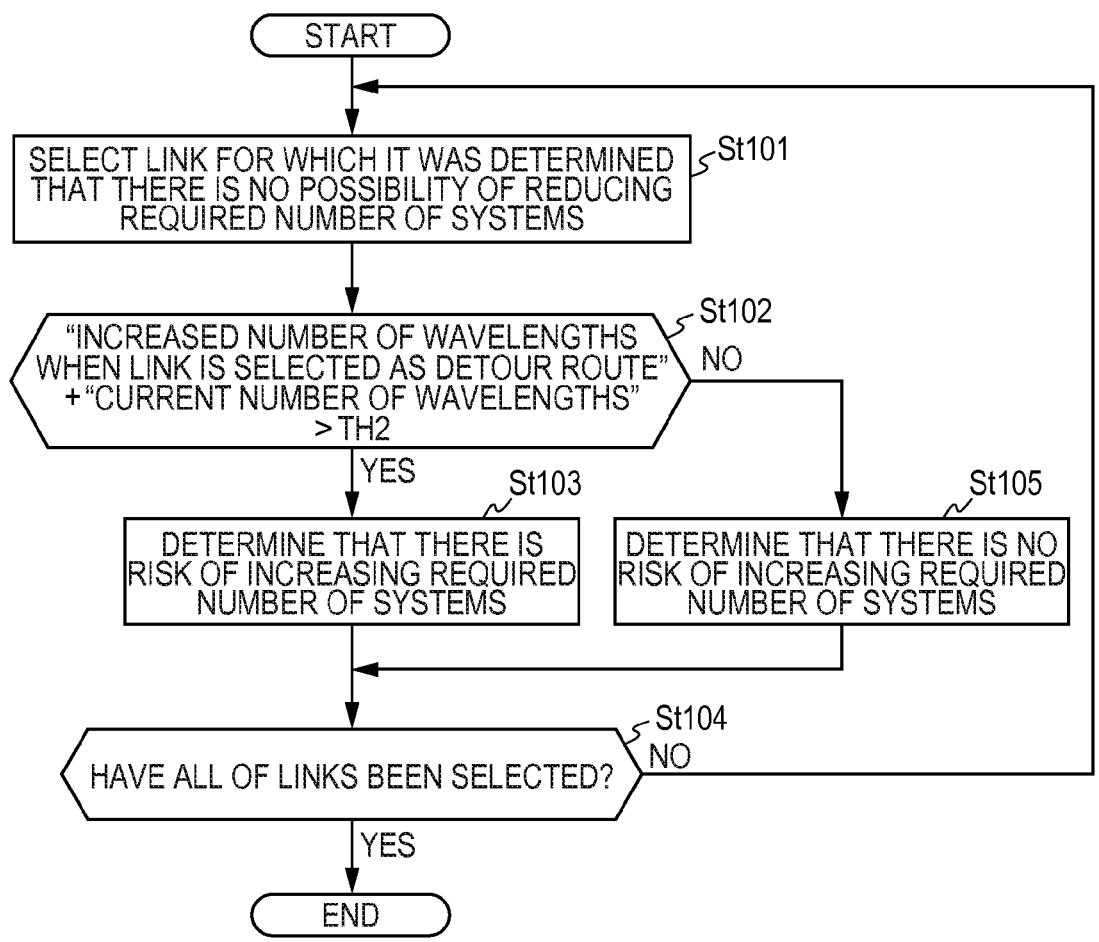
FIG. 27 is a diagram illustrating an example of an operational flowchart for determining a risk of increasing the number of transmission systems, according to an embodiment.

Referring back to FIG. 8, in step St5, the third processing unit 102 determines, for each link, whether or not there is a risk of increasing the required number of transmission systems. FIG. 27 is a diagram illustrating an example of an operational flowchart for determining a risk of increasing the required number of transmission systems, according to an embodiment. In this processing, a determination is made as to whether or not there is a risk of increasing the required number of transmission systems as a result of re-execution of the estimation processing performed by the first processing unit 100 and the assignment processing performed by the second processing unit 101.

First, in step St101, the third processing unit 102 selects a link for which it was determined that there is no possibility of reducing the required number of transmission systems. Next, in step St101, the third processing unit 102 determines, for the selected link, whether or not the total sum of the number of wavelengths that increase when the link is used as a detour route and the current number of wavelengths is larger than a predetermined threshold TH2.

The number of wavelengths that increase when the link is used as a detour route will now be described with reference to FIG. 26. It is assumed that the third processing unit 102 has determined that the link L2 has no possibility of reducing the required number of transmission systems and links L1 and L3 have a possibility of reducing the required number of transmission systems. When the link L2 is used as a detour route of the links L1 and L3, the number of wavelengths that increase in this case is 5 since it is the total sum of the number of detour routes, "3", of the communication channels G1 to G3 and the number of detour routes, "2", of the communication channels G4 and G5. The threshold TH2 is set at an arbitrary value.

When the total sum of the increased number of wavelengths and the current number of wavelengths is larger than the predetermined threshold TH2 (YES in step St102), the process proceeds to step St103 in which the third processing unit 102 determines that the selected link has a risk of increasing the required number of transmission systems. On the other hand, when the total sum of the increased number of wavelengths and the current number of wavelengths is smaller than or equal to the predetermined threshold TH2 (NO in step St102), the process proceeds to step St105 in which the third processing unit 102 determines that the selected link has no risk of increasing the required number of transmission systems.

As described above, upon determining that the selected link has no possibility of reducing the required number of transmission systems, the third processing unit 102 determines whether or not there is a risk of increasing the required number of transmission systems, based on the number of optical signal wavelengths that increase through use of the selected link as a detour route of another link. Thus, it is possible to inhibit an increase in the required number of transmission systems for the selected link, which is caused by an increase in the number of wavelengths of the selected link as a result of using the selected link as a detour route of another link.

Next, when all of the links have not yet been selected (NO in step St104), the third processing unit 102 performs the process in step St101 again. When all of the links have been selected (YES in step St104), the third processing unit 102 ends the processing. The processing for determining a risk of increasing the number of transmission systems is performed in the manner described above.

Referring back to FIG. 8, in step St6, the third processing unit 102 determines whether or not there is at least one link for which it was determined in step St4 that there is a possibility of reducing the required number of transmission systems. In this case, the third processing unit 102 makes the determination through reading the reduction determination information 141 from the HDD 13.

When there is at least one link for which it was determined that there is a possibility of reducing the required number of transmission systems (YES in step St6), the process proceeds to step St7 in which the third processing unit 102 determines whether or not the determination results obtained in steps St4 and St5 are different from the results obtained in the previous feedback processing. In this case, the third processing unit 102 makes the determination through reading the reduction determination information 141 and the risk-increase determination information 142 from the HDD 13.

When the determination results are the same as those obtained in the previous feedback processing (NO in step St7), the third processing unit 102 ends the processing. This arrangement inhibits permanent repetition of the design processing. When there is no link for which it was determined that there is a possibility of reducing the required number of transmission systems (NO in step St6), the third processing unit 102 ends the processing.

When the determination results are different from the results obtained in the previous feedback processing (YES in step St7), the process proceeds to step St8 in which the third processing unit 102 changes the constraint conditions in the communication channel design and the wavelength assignment design.

(Changes in Constraint Conditions)

Figure 28:
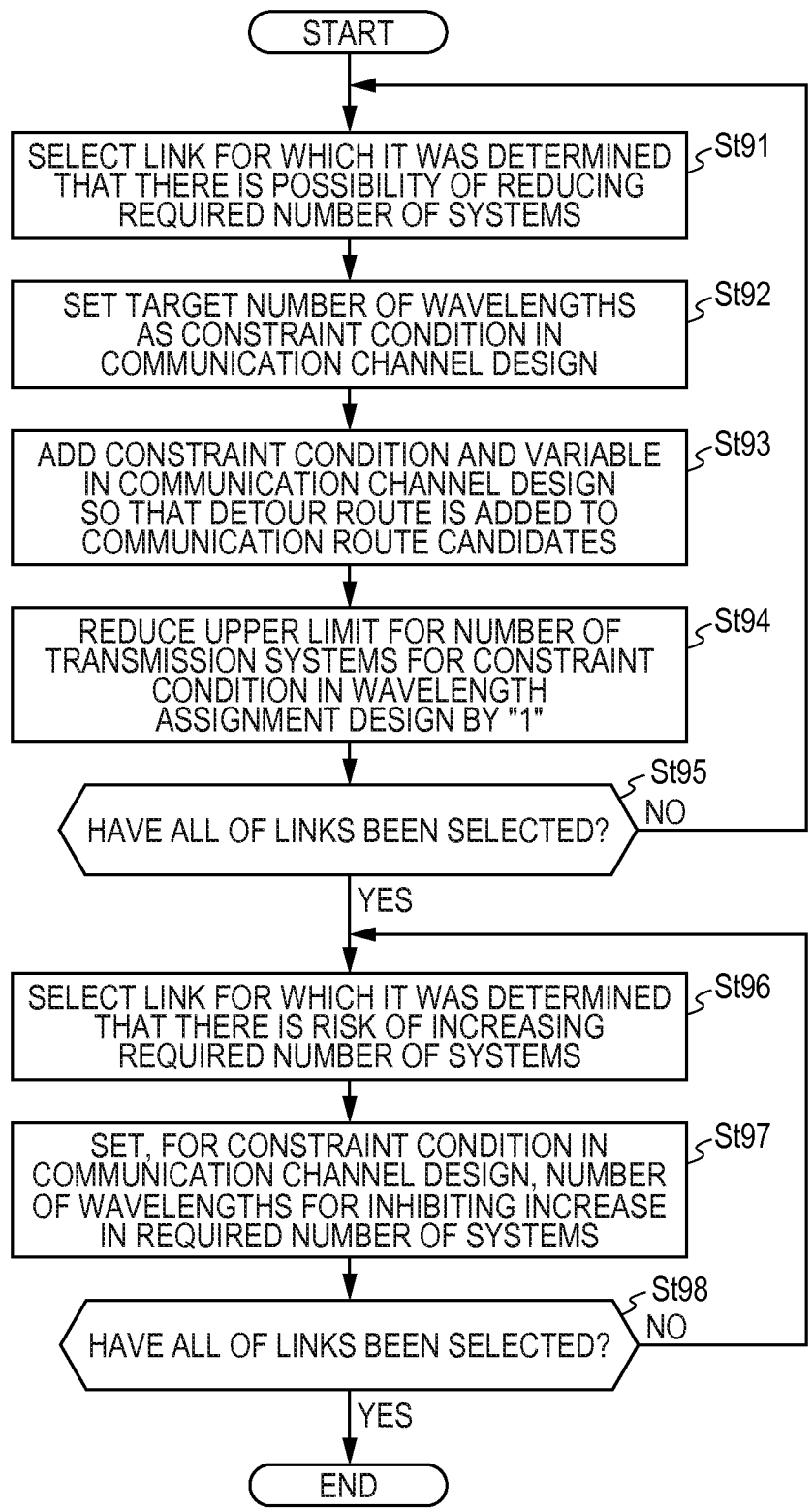
FIG. 28 is a diagram illustrating an example of an operational flowchart for changing the constraint conditions, according to an embodiment.

FIG. 28 is a diagram illustrating an example of an operational flowchart for changing constraint conditions, according to an embodiment. In step St91, the third processing unit 102 selects a link for which it was determined that there is a possibility of reducing the number of transmission systems. In step St92, with respect to the selected link, the third processing unit 102 sets the target number of wavelengths as the constraint condition in the communication channel design. That is, the third processing unit 102 sets, in the wavelength constraint information 135, the target number of wavelengths determined in the processing illustrated in FIG. 20. As a result, the upper limit for the number of wavelengths (the wavelength constraint condition) used in equation (4) noted above is changed.

In step St93, the third processing unit 102 adds a constraint condition and a variable in the communication channel design so that the detour route is added to the communication route candidates in the communication channel design. The constraint condition added in this case is analogous to the constraint condition described above with reference to equation (5) noted above. The variable added in this case corresponds to the detour route information 139 and is set for d(t) in the second term of equation (5). As a result, the first processing unit 100 becomes able to use the detour route as a communication route candidate (see step St17 in FIG. 9).

In step St94, with respect to the selected link, the third processing unit 102 reduces the upper limit for the number of transmission systems used for the constraint condition in the wavelength assignment design by "1". That is, the value of SystemNum(s) in equation (8) noted above is reduced by "1". As a result, the system constraint condition is changed in the wavelength assignment design.

When all of the links have not yet been selected (NO in step St95), the third processing unit 102 selects one of the unselected link(s) in step St91 and performs the process in step St92 again.

As described above, with respect to a link for which it was determined that there is a possibility of reducing the required number of transmission systems, the third processing unit 102 changes the wavelength constraint condition so that the upper limit for the number of wavelengths is the target number of wavelengths, and changes the system constraint condition so that the upper limit for the number of transmission systems is reduced.

When all of the links have been selected (YES in step St95), the process proceeds to step St96 in which the third processing unit 102 selects a link for which it was determined that there is a risk of increasing the required number of transmission systems. Next, in step St97, with respect to the selected link, the third processing unit 102 sets, for the constraint condition in the communication channel design, the number of wavelengths for inhibiting an increase in the required number of transmission systems. That is, the third processing unit 102 sets, in the wavelength constraint information 135, the maximum number of wavelengths allowed to inhibit an increase in the number of transmission systems. This changes the upper limit for the number of wavelengths (the wavelength constraint condition) used in equation (4) noted above.

When all of the links have not yet been selected (NO in step St98), the third processing unit 102 selects one of the unselected link(s) in step St96 and performs the process in step St97 again.

As described above, with respect to a link for which it was determined that there is a risk of increasing the required number of transmission systems, the third processing unit 102 changes the wavelength constraint condition so that the upper limit for the number of wavelengths is a maximum number allowed to inhibit an increase in the number of transmission systems. When all of the links have been selected (YES in step St98), the third processing unit 102 ends the processing. The processing for changing the constraint condition is performed in the manner described above.

Referring back to FIG. 8, after the constraint condition is changed (step St8), the process returns to step St1 in which the first processing unit 100 adds a detour route to the communication route candidates, determines a communication route, and performs the communication-channel estimation again in accordance with the changed wavelength constraint condition. Next, based on a result of the estimation performed by the first processing unit 100 again and in accordance with the changed system constraint condition, the second processing unit 101 performs the wavelength assignment again.

As described above, the third processing unit 102 feeds back the results of the previous communication channel design and wavelength assignment design to the first processing unit 100 and the second processing unit 101. Accordingly, it is possible to design a low-cost network in which the number of communication channels and the number of transmission systems are reduced.

Also, until the third processing unit 102 determines that there is no possibility of reducing the required number of transmission systems with respect to all of the links in the network (NO in step St6), the first processing unit 100 repeats the communication-channel estimation, and the second processing unit 101 repeats the wavelength assignment. Thus, since the previous design result is sufficiently fed back, various design parameters are adjusted, thereby providing an optimum design result. The network design is performed in the manner described above.

Figure 29A:
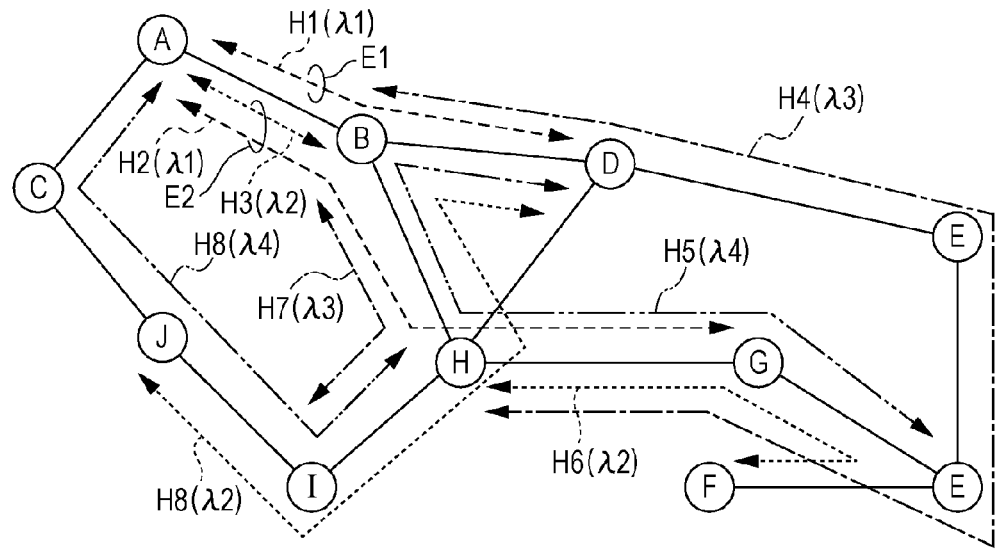
FIGS. 29A and 29B are diagrams illustrate an example of wavelength assignment in a comparative example and an example of wavelength assignment, according to an embodiment.
Figure 29B:
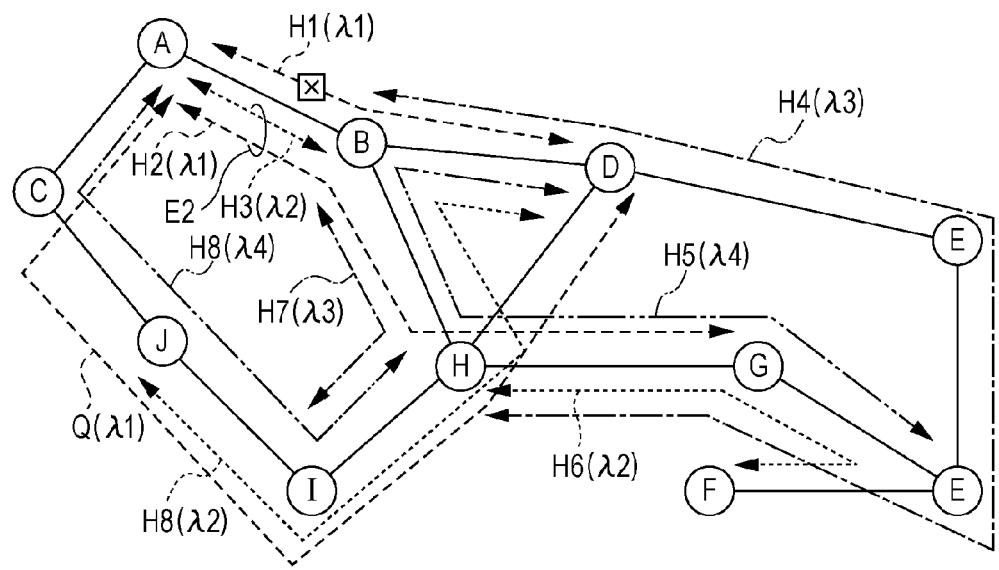

Since the first processing unit 100 adds a detour route to the communication route candidates and determines a communication route, as described above, it is possible to achieve the target number of wavelengths and to reduce the required number of transmission systems. In connection with the advantage, FIGS. 29A and 29B are diagrams illustrate an example of wavelength assignment in a comparative example and an example of wavelength assignment in the embodiment. FIG. 29A illustrates a result of wavelength assignment in the comparative example, and FIG. 29B illustrates a result of wavelength assignment according to an embodiment.

In this example, the network has nodes (A) to (J), and communication channels H1 to H8 that pass through the corresponding nodes (A) to (J) are set. The communication channels H1 to H8 are established along paths that provide connections between the nodes indicated by arrows, and are assigned wavelengths λ1 to λ4 indicated in the parentheses. The wavelength λ1 is denoted by a dotted line (large pitch), and the wavelength λ2 is denoted by a dotted line (small pitch). Also, the wavelength λ3 is denoted by a dashed-dotted line, and the wavelength λ4 is denoted by a long dashed double-short dashed line. The upper limit for the number of wavelengths for each link is assumed to be 4.

The result of the wavelength assignment in the comparative example is a result obtained by executing the communication channel design and the wavelength assignment design, without the third processing unit 102 performing the feedback processing. According to this result, although the upper limit for the number of wavelengths is obeyed for each link, two transmission systems E1 and E2 are used in the link between the nodes (A) and (B).

In contrast, according to the result of the wavelength assignment in the embodiment, a communication channel Q passing through a detour route is used, instead of the communication channel H1, as the communication channel that provides a connection between the nodes (A) and (D). As a result, the number of transmission systems for the link between the nodes (A) and (B) is "1". That is, only the transmission system E2 is used in the link. In addition, there is no link for which the required number of transmission systems has increased through use of the communication channel Q passing through the detour route.

As described above, when the wavelength assignment is considered in the communication channel design and a detour route for a path for communication channels is used as a communication route candidate corresponding to a demand, the required number of transmission systems is reduced, thereby making it possible to design a low cost network.

As described above, the network design apparatus 1 according to the embodiment has the first processing unit 100, the second processing unit 101, and the third processing unit 102. In response to a plurality of requests each requesting traffic between a pair of nodes in a network in which a multiplexed optical signal is transmitted, the first processing unit 100 determines a plurality of communication routes that each provide a connection between the pair of nodes. The first processing unit 100 estimates, each link in the network, communication channels to be established in each communication route, in accordance with a wavelength constraint condition that the number of communication channels that are allowed to be established be smaller than or equal to an upper limit for the number of available optical signal wavelengths.

The second processing unit 101 assigns, for each link in the network, wavelengths of optical signals multiplexed in the multiplexed optical signal to the communication channels, based on a result of the estimation performed by the first processing unit 100 and in accordance with a system constraint condition that the number of optical signals having the same wavelength that is able to be redundantly used be smaller than or equal to the upper limit for the number of transmission systems for transmitting the multiplexed optical signal.

Based on the result of the estimation performed by the first processing unit 100 and a result of the assignment performed by the second processing unit 101, the third processing unit 102 determines, for each link in the network, a target value for the number of wavelengths for reducing the required number of transmission systems. The third processing unit 102 then determines whether or not there is a possibility of reducing the required number of transmission systems, by determining whether or not the target value for the number of wavelengths is achieved by at least one of a change in the bandwidths of communication channels and a change in communication routes.

Upon determining that there is a possibility of reducing the required number of transmission systems, the third processing unit changes the wavelength constraint condition so that the upper limit for the number of wavelengths is a target number of the number of wavelengths and changes the system constraint condition so that the upper limit for the number of available transmission systems is reduced, with respect to the link. In accordance with the changed wavelength constraint condition, the first processing unit 100 estimates the communication channels again, and based on a result of the estimation performed by the first processing unit 100 again, the second processing unit 101 performs the wavelength assignment again in accordance with the changed system constraint condition.

In the network design apparatus 1 according to the embodiment, the first processing unit 100 determines a communication route corresponding to requested traffic and estimates communication channels to be established, in accordance with the wavelength constraint condition, thereby performing the communication channel design. Based on a result of the estimation performed by the first processing unit 100, the second processing unit 101 assigns wavelengths of optical signals to be transmitted by transmission systems and to be multiplexed into a multiplexed optical signal to the communication channels in accordance with the system constraint condition, thereby performing the wavelength assignment design.

Based on results of the communication channel design and the wavelength assignment design, the third processing unit 102 determines, for each link, whether or not there is a possibility of reducing the required number of transmission systems, by determining whether or not the target value for the number of wavelengths is achieved by a change in the bandwidths of communication channels or a change in communication routes. With respect to a link for which it was determined that there is a possibility of reducing the required number of transmission systems, the third processing unit 102 changes the wavelength constraint condition so that the upper limit for the number of wavelengths is the target value for the number of wavelengths, and changes the system constraint condition so that the upper limit for the number of available transmission systems is reduced.

In accordance with the changed wavelength constraint condition, the first processing unit 100 estimates the communication channels again, and based on a result of the estimation performed by the first processing unit 100 again, the second processing unit 101 performs the wavelength assignment again in accordance with the changed system constraint condition.

Accordingly, the third processing unit 102 is able to perform processing for feeding back the results of the communication channel design and the wavelength assignment design to the first processing unit 100 and the second processing unit 101. Hence, according to the network design apparatus 1, it is possible to efficiently design a low cost network by considering both of the number of communication channels and the number of transmission systems.

The network design method according to the embodiment includes first to third processes executed by a computer. In the first process, in response to a plurality of requests each requesting traffic between a pair of nodes in a network in which a multiplexed optical signal is transmitted, a plurality of communication routes each providing a connection between the pair of nodes are determined. In addition, in the first process, for each link in the network, communication channels to be established in each communication route are estimated in accordance with a wavelength constraint condition that the number of communication channels that are allowed to be established be smaller than or equal to an upper limit for the number of available optical signal wavelengths.

In the second process, for each link in network, wavelengths of optical signals multiplexed in the multiplexed optical signal are assigned to the communication channels, based on a result of the communication channel estimation and in accordance with a system constraint condition that the number of optical signals having the same wavelength that is redundantly usable be smaller than or equal to an upper limit for the number of transmission systems for transmitting the multiplexed optical signal.

In the third process, for each link in the network, a target value for the number of wavelengths for reducing the required number of transmission systems is determined based on the result of the communication channel estimation and a result of the wavelength assignment. In addition, in the third process, a determination is made whether or not there is a possibility of reducing the required number of transmission systems, by determining whether or not the target value for the number of wavelengths is achievable by at least one of a change in bandwidths of the communication channels and a change in the communication routes.

When it is determined in the third process for determining whether or not there is a possibility of reducing the required number of transmission systems that there is a possibility of reducing the required number of transmission systems, the wavelength constraint condition is changed so that the upper limit for the number of wavelengths is a target value for the number of wavelengths, and the system constraint condition is changed so that the upper limit for the number of available transmission systems is reduced, with respect to that link. The first process for performing the communication channel estimation is performed again in accordance with the changed wavelength constraint condition; and the second process for performing the wavelength assignment is performed again, based on a result of the communication channel estimation performed again and in accordance with the changed system constraint condition.

The network design method according to the embodiment offers operational effects that are the same as or similar to those described above, since it is applied to a configuration that is the same as or similar to that of the above-described network design apparatus 1.

The network design program according to the embodiment includes first to third processing to be executed by a computer. In the first processing, in response to a plurality of requests each requesting traffic between a pair of nodes in a network in which a multiplexed optical signal is transmitted, a plurality of communication routes each providing a connection between the pair of nodes are determined. In addition, in the first processing, for each link in the network, communication channels to be established in each communication route are estimated in accordance with a wavelength constraint condition that the number of communication channels that are allowed to be established be smaller than or equal to an upper limit for the number of usable optical signal wavelengths.

In the second processing, for each link in network, wavelengths of optical signals multiplexed in the multiplexed optical signal are assigned to the communication channels, based on a result of the communication channel estimation and in accordance with a system constraint condition that the number of optical signals having the same wavelength that is redundantly usable be smaller than or equal to an upper limit for the number of transmission systems for transmitting the multiplexed optical signal.

In the third processing, for each link in the network, a target value for the number of wavelengths for reducing the required number of transmission systems is determined based on the result of the communication channel estimation and a result of the wavelength assignment. In addition, in the third processing, a determination is made whether or not there is a possibility of reducing the required number of transmission systems, by determining whether or not the target value for the number of wavelengths is achievable by at least one of a change in bandwidths of the communication channels and a change in the communication routes.

When it is determined in the third processing for determining whether or not there is a possibility of reducing the required number of transmission systems that there is a possibility of reducing the required number of transmission systems, the wavelength constraint condition is changed so that the upper limit for the number of wavelengths is a target value for the number of wavelengths, and the system constraint condition is changed so that the upper limit for the number of available transmission systems is reduced, with respect to that link. The first processing for performing the communication channel estimation is performed again in accordance with the changed wavelength constraint condition; and the second process for performing the wavelength assignment is performed again, based on a result of the communication channel estimation performed again and in accordance with the changed system constraint condition.

The network design processing according to the embodiment offers operational effects that are the same as or similar to those described above, since it is applied to a configuration that is the same as or similar to that of the above-described network design apparatus 1.

Although the contents of the present disclosure have been specifically described above with reference to the preferred embodiments, it is apparent to those skilled in the art that various modification and changes are possible based on the basic technical spirit and the teaching of the present disclosure.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A network design apparatus comprising:
a processor configured:
to perform a first process including:
determining, in response to a plurality of demands each requesting traffic between a pair of nodes in a network in which one or more wavelength multiplexed optical signals are transmitted, a plurality of communication routes each providing a connection between the pair of nodes in the network, and
estimating, for each link in the network, communication channels to be established in each communication route, in accordance with a wavelength constraint condition that a number of the communication channels to be established be smaller than or equal to a first upper limit for a number of available optical signal wavelengths,
to perform a second process including
assigning, for each link in the network, wavelengths of optical signals to be multiplexed into the one or more wavelength multiplexed optical signals, to the communication channels, based on a result of the estimating of the first process and in accordance with a system constraint condition that a number of optical signals that have an identical wavelength and are redundantly usable be smaller than or equal to a second upper limit for a number of available transmission systems each configured to transmit a wavelength multiplexed optical signal, and
to perform a third process including:
determining, for each link in the network, a target number of wavelengths for reducing a required number of transmission systems that is required for accommodating the plurality of demands, based on a result of the estimating of the first process and a result of the assigning of the second process, and
determining whether there is a possibility of reducing the required number of transmission systems to be operated, by determining whether the target number of wavelengths is achievable by at least one of a change in bandwidths of the communication channels and a change in the plurality of communication routes; and
a memory configured to store information on the network and the plurality of demands, wherein,
upon determining that there is a possibility of reducing the required number of transmission systems, the third process changes the wavelength constraint condition so that the first upper limit is defined as the target number of wavelengths and changes the system constraint condition so that the second upper limit is reduced, with respect to the each link;
the first process re-estimates the communication channels in accordance with the changed wavelength constraint condition; and
the second process re-assigns wavelengths of the optical signals to be multiplexed, based on a result of the re-estimating of the first process and in accordance with the changed system constraint condition.

2. The network design apparatus of claim 1, wherein,
until the third process determines that there is no possibility of reducing the required number of transmission systems, with respect to all the links in the network, the first process repeats the estimating of the communication channels, and the second process repeats the assigning of the wavelengths of optical signals to be multiplexed.

3. The network design apparatus of claim 2, wherein for each link in the network, the third process adjusts the target number of wavelengths in accordance with a change in the required number of transmission systems, caused by a second or subsequent repetition of the assigning of the wavelengths via the second process.

4. The network design apparatus of claim 1, wherein,
when an amount of cost increase caused by a change in bandwidths of the communication channels exceeds an amount of cost reduction caused by a reduction in the required number of transmission systems, the third process determines that there is no possibility of reducing the required number of transmission systems.

5. The network design apparatus of claim 1, wherein the third process determines whether or not the target number of wavelengths is achievable by changing, among the plurality of communication routes, a communication route passing through the each link to a detour route bypassing the each link.

6. The network design apparatus of claim 1, wherein,
upon determining that there is no possibility of reducing the required number of transmission systems, the third process determines whether or not there is a risk of increasing the required number of transmission systems, caused by the first process performing the re-estimating of the communication channels and the second process performing the re-assigning of the wavelengths, based on a number of optical signal wavelengths that are increased by using the each link as a detour route of another link;
upon determining that there is a risk of increasing the required number of transmission systems, the third process changes, for the each link, the wavelength constraint condition so that the first upper limit is defined as a maximum number that is achievable without increasing the required number of transmission systems;
the first process re-determines the plurality of communication routes by adding the detour route to the plurality of communication routes, and re-estimates the communication channels in accordance with the changed wavelength constraint condition; and the second process re-assigns the wavelengths, based on a result of the re-estimating of the first process and in accordance with the system constraint condition.

7. A network design method comprising:
a first process including:
   determining, in response to a plurality of demands each requesting traffic between a pair of nodes in a network in which one or more wavelength multiplexed optical signals are transmitted, a plurality of communication routes each providing a connection between the pair of nodes in the network, and
   estimating, for each link in the network, communication channels to be established in each communication route, in accordance with a wavelength constraint condition that a number of the communication channels to be established be smaller than or equal to a first upper limit for a number of available optical signal wavelengths;
a second process including
   assigning, for each link in the network, wavelengths of optical signals to be multiplexed into the one or more wavelength multiplexed optical signals, to the communication channels, based on a result of the estimating of the first process and in accordance with a system constraint condition that a number of optical signals that have an identical wavelength and are redundantly usable be smaller than or equal to a second upper limit for a number of available transmission systems each configured to transmit a wavelength multiplexed optical signal; and
a third process including:
   determining, for each link in the network, a target number of wavelengths for reducing a required number of transmission systems that is required for accommodating the plurality of demands, based on a result of the estimating of the first process and a result of the assigning of the second process, and
   determining whether there is a possibility of reducing the required number of transmission systems to be operated, by determining whether the target number of wavelengths is achievable by at least one of a change in bandwidths of the communication channels and a change in the plurality of communication routes, wherein,
upon determining that there is a possibility of reducing the required number of transmission systems, the third process changes the wavelength constraint condition so that the first upper limit is defined as the target number of wavelengths and changes the system constraint condition so that the second upper limit is reduced, with respect to the each link;
the first process re-estimates the communication channels in accordance with the changed wavelength constraint condition; and
the second process re-assigns wavelengths of the optical signals to be multiplexed, based on a result of the re-estimating of the first process and in accordance with the changed system constraint condition.

8. The network design method of claim 7, wherein,
until the third process determines that there is no possibility of reducing the required number of transmission systems, with respect to all the links in the network, the first process repeats the estimating of the communication channels, and the second process repeats the assigning of the wavelengths of optical signals to be multiplexed.

9. The network design method of claim 8, wherein,
for each link in the network, the third process adjusts the target number of wavelengths in accordance with a change in the required number of transmission systems, caused by a second or subsequent repetition of the assigning of the wavelengths via the second process.

10. The network design method of claim 7, wherein,
when an amount of cost increase caused by a change in bandwidths of the communication channels exceeds an amount of cost reduction caused by a reduction in the required number of transmission systems, the third process determines that there is no possibility of reducing the required number of transmission systems.

11. The network design method of claim 7, wherein
the third process determines whether or not the target number of wavelengths is achievable by changing, among the plurality of communication routes, a communication route passing through the each link to a detour route bypassing the each link.

12. The network design method of claim 7, wherein,
upon determining that there is no possibility of reducing the required number of transmission systems, the third process determines whether or not there is a risk of increasing the required number of transmission systems, caused by the first process performing the re-estimating of the communication channels and the second process performing the re-assigning of the wavelengths, based on a number of optical signal wavelengths that are increased by using the each link as a detour route of another link;
upon determining that there is a risk of increasing the required number of transmission systems, the third process changes, for the each link, the wavelength constraint condition so that the first upper limit is defined as a maximum number that is achievable without increasing the required number of transmission systems;
the first process re-determines the plurality of communication routes by adding the detour route to the plurality of communication routes, and re-estimates the communication channels in accordance with the changed wavelength constraint condition; and
the second process re-assigns the wavelengths, based on a result of the re-estimating of the first process and in accordance with the system constraint condition.

13. A non-transitory, computer-readable recording medium having stored therein a program for causing a computer to execute a process comprising:
a first process including:
   determining, in response to a plurality of demands each requesting traffic between a pair of nodes in a network in which one or more wavelength multiplexed optical signals are transmitted, a plurality of communication routes each providing a connection between the pair of nodes in the network, and
   estimating, for each link in the network, communication channels to be established in each communication route, in accordance with a wavelength constraint condition that a number of the communication channels to be established be smaller than or equal to a first upper limit for a number of available optical signal wavelengths;
a second process including
   assigning, for each link in the network, wavelengths of optical signals to be multiplexed into the one or more wavelength multiplexed optical signals, to the communication channels, based on a result of the estimating of the first process and in accordance with a system constraint condition that a number of optical signals that have an identical wavelength and are redundantly usable be smaller than or equal to a second upper limit for a number of available transmission systems each configured to transmit a wavelength multiplexed optical signal; and a third process including:
determining, for each link in the network, a target number of wavelengths for reducing a required number of transmission systems that is required for accommodating the plurality of demands, based on a result of the estimating of the first process and a result of the assigning of the second process, and determining whether there is a possibility of reducing the required number of transmission systems, by determining whether the target number of wavelengths is achievable by at least one of a change in bandwidths of the communication channels and a change in the plurality of communication routes, wherein, upon determining that there is a possibility of reducing the required number of transmission systems, the third process changes the wavelength constraint condition so that the first upper limit is defined as the target number of wavelengths and changes the system constraint condition so that the second upper limit is reduced, with respect to the each link;

the first process re-estimates the communication channels in accordance with the changed wavelength constraint condition; and the second process re-assigns wavelengths of the optical signals to be multiplexed, based on a result of the re-estimating of the first process and in accordance with the changed system constraint condition.

14. The non-transitory, computer-readable recording medium of claim 13, wherein,
until the third process determines that there is no possibility of reducing the required number of transmission systems, with respect to all the links in the network, the first process repeats the estimating of the communication channels, and the second process repeats the assigning of the wavelengths of optical signals to be multiplexed.

15. The non-transitory, computer-readable recording medium of claim 14, wherein,
for each link in the network, the third process adjusts the target number of wavelengths in accordance with a change in the required number of transmission systems, caused by a second or subsequent repetition of the assigning of the wavelengths via the second process.

16. The non-transitory, computer-readable recording medium of claim 13, wherein,
when an amount of cost increase caused by a change in bandwidths of the communication channels exceeds an amount of cost reduction caused by a reduction in the required number of transmission systems, the third process determines that there is no possibility of reducing the required number of transmission systems.

17. The non-transitory, computer-readable recording medium of claim 13, wherein
the third process determines whether or not the target number of wavelengths is achievable by changing, among the plurality of communication routes, a communication route passing through the each link to a detour route bypassing the each link.

18. The non-transitory, computer-readable recording medium of claim 13, wherein,
upon determining that there is no possibility of reducing the required number of transmission systems, the third process determines whether or not there is a risk of increasing the required number of transmission systems, caused by the first process performing the re-estimating of the communication channels and the second process performing the re-assigning of the wavelengths, based on a number of optical signal wavelengths that are increased by using the each link as a detour route of another link;

upon determining that there is a risk of increasing the required number of transmission systems, the third process changes, for the each link, the wavelength constraint condition so that the first upper limit is defined as a maximum number that is achievable without increasing the required number of transmission systems;

the first process re-determines the plurality of communication routes by adding the detour route to the plurality of communication routes, and re-estimates the communication channels in accordance with the changed wavelength constraint condition; and the second process re-assigns the wavelengths, based on a result of the re-estimating of the first process and in accordance with the system constraint condition.

* * * * *